United States Patent
Raghavan et al.

(10) Patent No.: US 10,475,185 B1
(45) Date of Patent: Nov. 12, 2019

(54) ASSOCIATING A USER WITH AN EVENT

(71) Applicant: Amazon Technologies, Inc., Seatttle, WA (US)

(72) Inventors: Sudarshan Narasimha Raghavan, Snoqualmie, WA (US); Emilio Ian Maldonado, Seattle, WA (US); Dilip Kumar, Seattle, WA (US); Daniel Bibireata, Bellevue, WA (US); Ammar Chinoy, Seattle, WA (US); Nishitkumar Ashokkumar Desai, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/581,992

(22) Filed: Dec. 23, 2014

(51) Int. Cl.
*G06T 7/00* (2017.01)
*G06K 9/00* (2006.01)
*G06T 7/73* (2017.01)
*G06T 7/50* (2017.01)

(52) U.S. Cl.
CPC ........ *G06T 7/0042* (2013.01); *G06K 9/00335* (2013.01); *G06K 9/00375* (2013.01); *G06K 9/00771* (2013.01); *G06T 7/50* (2017.01); *G06T 7/73* (2017.01)

(58) Field of Classification Search
CPC ................ G06T 7/0042; G06T 7/0051; G06T 2207/30232; G06K 9/00771; G06K 9/00335; G06K 9/00355; G06K 9/00362; G06K 9/00375; B60R 2300/102; B60R 2300/8073
See application file for complete search history.

(56) References Cited

U.S. PATENT DOCUMENTS

| | | |
|---|---|---|
| 5,497,314 A | 3/1996 | Novak |
| 5,671,362 A | 9/1997 | Cowe et al. |
| 6,412,694 B1 | 7/2002 | Kumar |
| 6,424,370 B1 | 7/2002 | Courtney |
| 6,909,356 B2 | 6/2005 | Brown et al. |
| 6,915,135 B1 | 7/2005 | McKee et al. |
| 7,225,980 B2 | 6/2007 | Ku et al. |
| 7,227,893 B1 | 6/2007 | Srinivasa et al. |
| 7,522,057 B2 | 4/2009 | Stern et al. |
| 7,903,141 B1 | 3/2011 | Mariano et al. |
| 7,949,568 B2 | 5/2011 | Fano et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Jon Chang
(74) *Attorney, Agent, or Firm* — Athorus, PLLC

(57) ABSTRACT

Described is a multiple-camera system and process for identifying a user that performed an event and associating that user with the event. For example, when an event is detected, user patterns near the location of the event are determined, along with touch points at the location of the event. User pattern orientation and/or arm trajectories between the event location and the user pattern may be determined and processed to link the user pattern to the event, thereby confirming the association between the event and the user.

21 Claims, 23 Drawing Sheets

(56) References Cited

U.S. PATENT DOCUMENTS

| | | |
|---|---|---|
| 8,009,863 B1 | 8/2011 | Sharma et al. |
| 8,009,864 B2 | 8/2011 | Linaker et al. |
| 8,175,925 B1 | 5/2012 | Rouaix |
| 8,189,855 B2 | 5/2012 | Opalach et al. |
| 8,264,422 B1 | 9/2012 | Persson et al. |
| 8,325,036 B1 | 12/2012 | Fuhr et al. |
| 8,423,431 B1 | 4/2013 | Rouaix et al. |
| 8,538,820 B1 | 9/2013 | Migdal et al. |
| 8,577,705 B1 | 11/2013 | Baboo et al. |
| 8,630,924 B2 | 1/2014 | Groenevelt et al. |
| 8,688,598 B1 | 4/2014 | Shakes et al. |
| 8,695,878 B2 | 4/2014 | Burnside et al. |
| 8,810,392 B1 | 8/2014 | Teller et al. |
| 8,817,094 B1 | 8/2014 | Brown et al. |
| 8,908,903 B2 | 12/2014 | Deng et al. |
| 9,020,264 B2 | 4/2015 | Maeda |
| 9,026,941 B1 | 5/2015 | Krueger et al. |
| 9,124,778 B1 | 9/2015 | Crabtree |
| 9,396,490 B1 | 7/2016 | Marx et al. |
| 9,473,747 B2 | 10/2016 | Kobres et al. |
| 9,659,272 B2 | 5/2017 | Birch et al. |
| 9,740,937 B2 | 8/2017 | Zhang et al. |
| 9,747,497 B1 | 8/2017 | Sharma et al. |
| 9,813,607 B2 | 11/2017 | Kalevo et al. |
| 2003/0002712 A1 | 1/2003 | Steenburgh et al. |
| 2003/0216969 A1 | 11/2003 | Bauer et al. |
| 2004/0168172 A1 | 8/2004 | Masuda |
| 2004/0181467 A1 | 9/2004 | Raiyani et al. |
| 2005/0073585 A1 | 4/2005 | Ettinger et al. |
| 2005/0105765 A1 | 5/2005 | Han et al. |
| 2005/0131578 A1 | 6/2005 | Weaver |
| 2005/0185823 A1 | 8/2005 | Brown et al. |
| 2005/0189412 A1 | 9/2005 | Hudnut et al. |
| 2005/0200476 A1 | 9/2005 | Forr et al. |
| 2006/0032915 A1 | 2/2006 | Schwartz |
| 2006/0251339 A1 | 11/2006 | Gokturk et al. |
| 2006/0256082 A1 | 11/2006 | Cho et al. |
| 2007/0179921 A1 | 8/2007 | Zitnick et al. |
| 2008/0018738 A1 | 1/2008 | Lipton et al. |
| 2008/0019589 A1 | 1/2008 | Yoon et al. |
| 2008/0031491 A1* | 2/2008 | Ma ............... G06K 9/00771 382/103 |
| 2008/0055087 A1 | 3/2008 | Horii et al. |
| 2008/0055194 A1 | 3/2008 | Baudino et al. |
| 2008/0059570 A1 | 3/2008 | Bill |
| 2008/0077511 A1 | 3/2008 | Zimmerman |
| 2008/0100704 A1 | 5/2008 | Venetianer et al. |
| 2008/0109114 A1 | 5/2008 | Orita et al. |
| 2008/0130948 A1 | 6/2008 | Ozer |
| 2008/0130951 A1* | 6/2008 | Wren ............... H04N 7/18 382/103 |
| 2008/0159634 A1* | 7/2008 | Sharma ............... G06K 9/00771 382/224 |
| 2008/0193010 A1 | 8/2008 | Eaton et al. |
| 2008/0198231 A1 | 8/2008 | Ozdemir et al. |
| 2008/0221943 A1 | 9/2008 | Porter et al. |
| 2008/0226129 A1 | 9/2008 | Kundu et al. |
| 2008/0260212 A1 | 10/2008 | Moskal et al. |
| 2008/0303901 A1 | 12/2008 | Variyath et al. |
| 2009/0039165 A1 | 2/2009 | Collins et al. |
| 2009/0059270 A1 | 3/2009 | Opalach et al. |
| 2009/0083122 A1 | 3/2009 | Angell et al. |
| 2009/0121017 A1 | 5/2009 | Cato et al. |
| 2009/0232366 A1 | 9/2009 | Okochi et al. |
| 2009/0245573 A1 | 10/2009 | Saptharishi et al. |
| 2009/0259571 A1 | 10/2009 | Ebling et al. |
| 2010/0013931 A1 | 1/2010 | Golan et al. |
| 2010/0019905 A1 | 1/2010 | Boddie et al. |
| 2010/0026802 A1 | 2/2010 | Titus et al. |
| 2010/0060455 A1 | 3/2010 | Frabasile |
| 2010/0082301 A1 | 4/2010 | Skibiski et al. |
| 2010/0117959 A1 | 5/2010 | Hong et al. |
| 2010/0138037 A1 | 6/2010 | Adelberg et al. |
| 2010/0250305 A1 | 9/2010 | Lee et al. |
| 2010/0265074 A1* | 10/2010 | Namba ............... G06K 9/00771 340/576 |
| 2010/0277277 A1 | 11/2010 | Green et al. |
| 2010/0318440 A1 | 12/2010 | Coveley |
| 2011/0011936 A1 | 1/2011 | Morandi et al. |
| 2011/0102588 A1 | 5/2011 | Trundle et al. |
| 2011/0115914 A1 | 5/2011 | Bailey et al. |
| 2011/0228984 A1 | 9/2011 | Papke et al. |
| 2011/0234840 A1 | 9/2011 | Klefenz et al. |
| 2011/0242025 A1 | 10/2011 | Wen et al. |
| 2011/0280547 A1 | 11/2011 | Fan et al. |
| 2011/0295644 A1 | 12/2011 | Hara et al. |
| 2011/0320322 A1 | 12/2011 | Roslak et al. |
| 2012/0080517 A1 | 4/2012 | Braunstein |
| 2012/0284132 A1 | 11/2012 | Kim et al. |
| 2012/0310727 A1 | 12/2012 | Bradley et al. |
| 2013/0076898 A1 | 3/2013 | Philippe et al. |
| 2013/0077820 A1* | 3/2013 | Marais ............... G06K 9/00335 382/103 |
| 2013/0110565 A1 | 5/2013 | Means, Jr. et al. |
| 2013/0182114 A1* | 7/2013 | Zhang ............... H04N 7/18 348/150 |
| 2013/0182904 A1 | 7/2013 | Zhang et al. |
| 2013/0197968 A1 | 8/2013 | Davis et al. |
| 2013/0208115 A1 | 8/2013 | Park et al. |
| 2013/0216094 A1 | 8/2013 | Delean |
| 2013/0223673 A1 | 8/2013 | Davis et al. |
| 2013/0250115 A1 | 9/2013 | Fan et al. |
| 2013/0253700 A1 | 9/2013 | Carson et al. |
| 2013/0265232 A1 | 10/2013 | Yun et al. |
| 2013/0290106 A1 | 10/2013 | Bradley et al. |
| 2013/0322686 A1 | 12/2013 | Kritt et al. |
| 2013/0342316 A1 | 12/2013 | Ghaffari et al. |
| 2014/0052555 A1 | 2/2014 | MacIntosh |
| 2014/0201039 A1 | 7/2014 | Harwell et al. |
| 2014/0222501 A1 | 8/2014 | Hirakawa et al. |
| 2014/0240088 A1 | 8/2014 | Robinette et al. |
| 2014/0279294 A1 | 9/2014 | Field-Darragh et al. |
| 2014/0293032 A1 | 10/2014 | Gontina |
| 2014/0304123 A1 | 10/2014 | Schwartz |
| 2014/0351098 A1 | 11/2014 | Shafer et al. |
| 2014/0365334 A1 | 12/2014 | Hurewitz |
| 2014/0365336 A1 | 12/2014 | Hurewitz |
| 2015/0012426 A1 | 1/2015 | Purves et al. |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0073907 A1 | 3/2015 | Purves et al. |
| 2015/0117703 A1 | 4/2015 | Peng et al. |
| 2015/0199698 A1 | 7/2015 | Yoshitake et al. |
| 2015/0206188 A1 | 7/2015 | Tanigawa et al. |
| 2015/0206335 A1* | 7/2015 | Hugel ............... A63F 13/10 345/419 |
| 2015/0235161 A1 | 8/2015 | Azar et al. |
| 2015/0310447 A1 | 10/2015 | Shaw |
| 2015/0348060 A1 | 12/2015 | Ogawa et al. |
| 2016/0055555 A1 | 2/2016 | Mills et al. |
| 2016/0071052 A1 | 3/2016 | Henry et al. |
| 2016/0125265 A1 | 5/2016 | Xie et al. |
| 2016/0203499 A1 | 7/2016 | Yamashita et al. |
| 2016/0335667 A1 | 11/2016 | Aubrey |
| 2017/0344832 A1 | 11/2017 | Leung et al. |

OTHER PUBLICATIONS

Burger, et al., Two-handed gesture recognition and fusion with speech to command a robot, Auton Robot, 2011, p. 1-19.

Cristian Pop, "Introduction to the BodyCom Technology", Microchip AN1391, May 2, 2011, pp. 1-26, vol. AN1391, No. DS01391A, Publisher: 2011 Microchip Technology Inc.

Ren, et al., Learning Probabilistic Models for Contour Completion in Natural Images, Int J Comput Vis, 2008, pp. 47-63.

Krahnstoever, Automated Detection and Prevention of Disorderly and Criminal Activities, Final Report, Sensor Surveillance Program, Grant No. 2007-RG-CX-K015, GE Global Research, 2011, pp. 1-128 (Year 2011).

(56) References Cited

OTHER PUBLICATIONS

Liu, et al., "Tracking Sports Players with Context-Conditioned Motion Models," 2013 IEEE Conference on Computer Vision and Pattern Recognition, Oct. 3, 2013, pp. 1830-1837 (Year: 2013).

* cited by examiner

ASSOCIATING A USER WITH AN EVENT

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
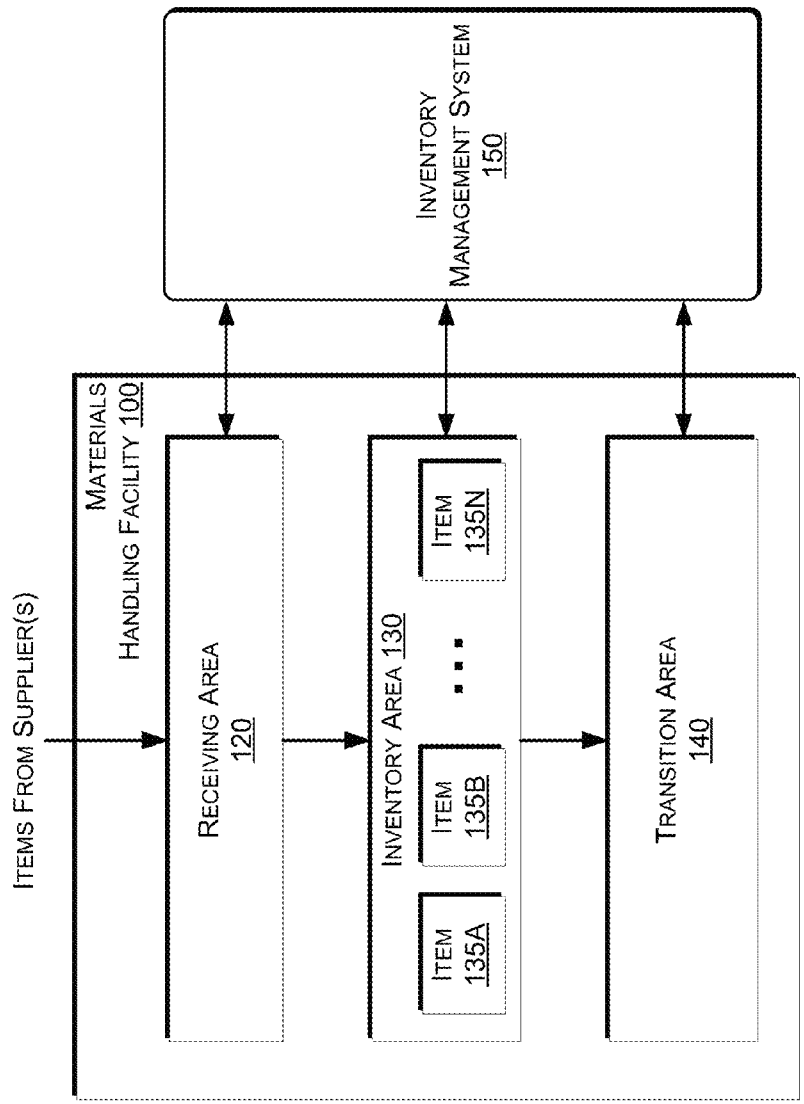
FIG. 1 is a block diagram illustrating a materials handling facility, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a multiple-camera system and process for identifying a user that performed an event and associating that user with the event. For example, when an event is detected, user patterns near the location of the event are determined, along with touch points near the location of the event. User pattern orientation and/or arm trajectories between the event location and the user pattern may be determined and processed to link the user pattern to the event, thereby confirming the association between the event and the user.

When there are multiple users near an event location, the implementations described herein provide the ability to disambiguate between the multiple users and determine which user performed the event. For example, potential arm trajectories and/or touch points between the event location and each of the users near the event location may be determined and considered in associating a user with the event. Likewise, it may be determined if other events near the event location have occurred and, if so, the probability of the users performing those other events may be considered as a factor in determining the probability that the same user performed the events. As still another example, the duration of touch points for different users and/or whether an area near the event location is occluded by a user may be determined and used to assist in disambiguating between multiple users to determine which user performed an event.

In still other implementations, item(s) involved in the event may be determined. For example, the time and location of the event may be received and inputs from other components near the event (e.g., load cells, radio frequency identification (RFID) readers, scanners, visual identification readers) may be obtained and the collective information may be used to determine which item is involved in the event.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

An implementation of a materials handling facility configured to store and manage inventory items is illustrated in FIG. 1. As shown, a materials handling facility 100 includes a receiving area 120, an inventory area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, inventory areas 130 and transition areas 140 may be interspersed rather than segregated. Additionally, the materials handling facility 100 includes an inventory management system 150 configured to interact with each of receiving area 120, inventory area 130, transition area 140 and/or users within the materials handling facility 100.

The materials handling facility 100 may be configured to receive different kinds of inventory items 135 from various suppliers and to store them until a user orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135, such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within inventory area 130 on an inventory shelf. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover or velocity within a large physical facility, those items 135 may be stored in several different locations to reduce congestion that might occur at a single point of storage.

When a user order specifying one or more items 135 is received, or as a user progresses through the materials handling facility 100, the corresponding items 135 may be selected or "picked" from the inventory area 130. For example, in one implementation, a user may have a list of items to pick and may progress through the materials handling facility picking items 135 from the inventory area 130. In other implementations, materials handling facility employees (referred to herein as users) may pick items 135 using written or electronic pick lists derived from orders. In some instances, an item may need to be repositioned from one location within the inventory area 130 to another location. For example, in some instances, an item may be picked from its inventory location, moved a distance and placed at another location.

Figure 2:
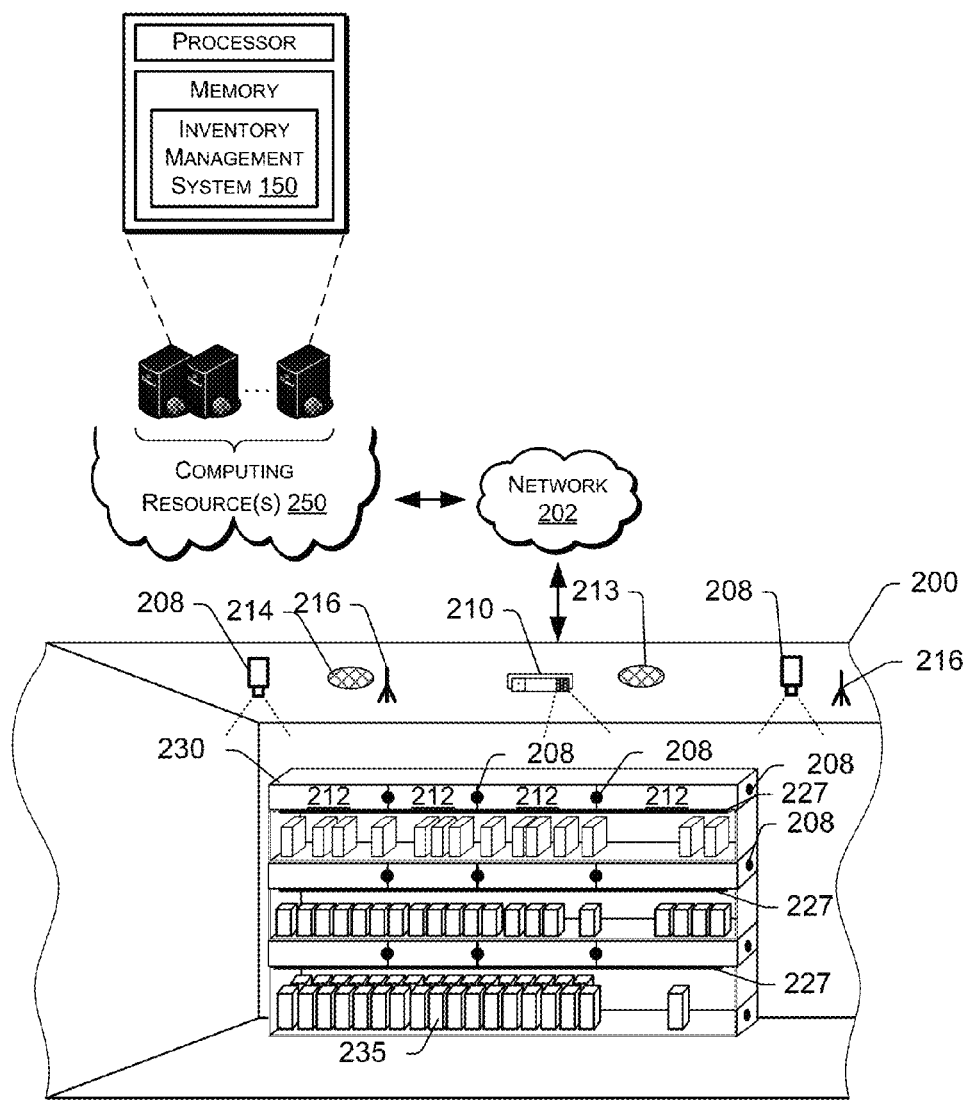
FIG. 2 shows additional components of the materials handling facility of FIG. 1, according to an implementation.

FIG. 2 shows additional components of a materials handling facility 200, according to one implementation. Generally, the materials handling facility 200 may include one or more image capture devices, such as cameras 208. For example, one or more cameras 208 may be positioned in locations of the materials handling facility 200 so that images of locations, items, and/or users within the materials handling facility can be captured. In some implementations, the image capture devices 208 may be positioned overhead, such as on the ceiling, to capture images of users and/or locations within the materials handling facility. In addition, in some implementations, one or more cameras 208 may be positioned on or inside of inventory areas. For example, a series of cameras 208 may be positioned on external portions of the inventory areas and positioned to capture images of users and/or the location surrounding the inventory area. Likewise, one or more multiple-camera apparatus 227 may be positioned within the inventory areas to capture images of items stored in the inventory areas.

Any type of camera and/or configuration of cameras may be used with the implementations described herein. For example, one or more of the cameras may be a red, green, blue ("RGB") color camera, still camera, motion capture/video camera, etc. In other implementations, one or more of the cameras may be depth sensing cameras, also referred to herein as a RGBD camera. In still other implementations, one or more of the cameras may be a thermographic or infrared (IR) camera, etc. In some implementations, the cameras may simply be camera modules that include a lens and an image sensor. The image sensor may convert an optical image obtained by the lens of the camera into a digital signal or digital representation of the image (generally referred to herein as image data). In one implementation, the image sensor may be a RGB sensor capable of supporting an image resolution of at least 860×480 at six frames per second. The image sensor may likewise be configured to provide the image data to other components (e.g., a graphics processing unit) for processing. In some implementations, cameras may be paired to provide stereo imagery and depth information. A stereo camera may include a pair of camera modules. Image data may be stored in any variety of formats including, but not limited to, YUYV, RGB, RAW, bmp, jpeg, etc.

Cameras operate by electronically capturing reflected light from objects and assigning quantitative values to one or more aspects of the reflected light, such as pixels. A camera may include one or more sensors having one or more filters associated therewith. The sensors of a camera may capture information regarding any number of pixels of the reflected light corresponding to one or more base colors (e.g., red, green or blue) expressed in the reflected light, and store values associated with the pixel colors as image data and/or transmit image data to another device for further analysis or reproduction. The camera may also be configured to determine depth information, such as the distance between the camera and an object in the field of view of the camera. Depth information may be included in the image data generated by the camera.

Information and/or data regarding features or objects represented in a digital image may be extracted from the image in any number of ways. For example, a color of a pixel or a group of pixels in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, a texture of a feature or object expressed in a digital image may be identified using one or more computer-based methods, such as by identifying changes in intensities within regions or sectors of the image, or by defining areas of an image corresponding to specific surfaces. Furthermore, outlines of objects may be identified in a digital image using one or more algorithms or machine-learning tools. For example, some such algorithms or tools may recognize edges, contours or outlines of objects in the digital image, or of portions of objects, and may match the edges, contours or outlines of the objects against a database containing information regarding edges, contours or outlines of known objects.

In addition to cameras, other input devices, such as pressure sensors, infrared sensors, scales, light curtains, load cells, RFID readers, etc., may be utilized with the implementations described herein. For example, a pressure sensor and/or a scale may be used to detect the presence or absence of items and/or to determine when an item is added and/or removed from inventory areas. Likewise, a light curtain may be positioned to cover the front of an inventory area and detect when an object (e.g., a user's hand) passes into or out of the inventory area. The light curtain may also include a reader, such as an RFID reader, that can detect a tag included on an item as the item passes into or out of the inventory location. For example, if the item includes an RFID tag, an RFID reader may detect the RFID tag as the item passes into or out of the inventory location. Alternatively, or in addition thereto, the inventory shelf may include one or more antenna elements coupled to an RFID reader that are configured to read RFID tags of items located on the inventory shelf.

When a user arrives at the materials handling facility 200, one or more images of the user may be captured and processed. For example, the images of the user may be processed to identify the user. This may be done using a variety of techniques, such as facial recognition, pattern matching, etc. In some implementations, rather than or in addition to processing images to identify the user, other techniques may be utilized to identify the user. For example, the user may provide an identification (e.g., user name, password), the user may present an identifier (e.g., identification badge, card), an RFID tag in the possession of the user may be detected, a visual tag (e.g., barcode, bokode, watermark) in the possession of the user may be detected, biometrics may be utilized to identify the user, etc.

Figure 11:
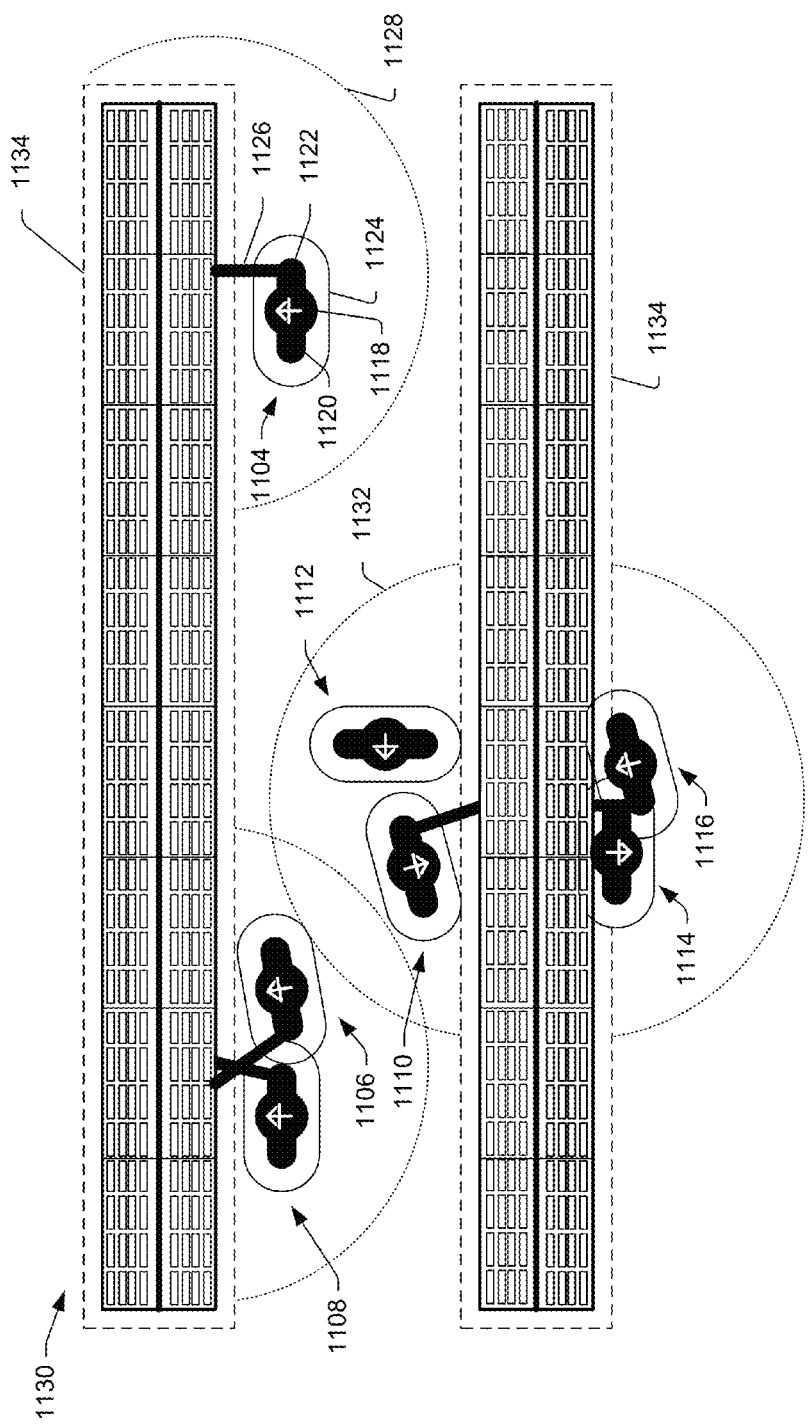
FIG. 11 is a block diagram of an inventory area and multiple user patterns, according to an implementation.

The captured images and/or other inputs may also be used to establish a user pattern for the user while located in the materials handling facility 200. The user pattern may identify an overall shape, size, height, etc., of the user and/or any distinguishing identifiers (e.g., color of shirt, height) that may be used to assist in the identification and/or tracking of the user as they progress through the materials handling facility 200. For example, referring briefly to FIG. 11, illustrated are several user patterns 1104, 1106, 1108, 1110, 1112, 1114, 1116 of different users within an inventory area 1130 of a materials handling. In this implementation, the user patterns are determined from overhead cameras positioned above the inventory area 1130 and oriented to obtain images of users as they move through the inventory area 1130. As the user moves, the position and orientation of the user pattern 1104-1116 is updated.

Returning to FIG. 2, in some implementations, a user located in the materials handling facility 200 may possess a portable device and obtain information about items located within the materials handling facility 200, receive confirmation that the inventory management system 150 has correctly identified items that are picked and/or placed by the user, receive requests for confirmation regarding one or more event aspects, etc. Generally, the portable device has at least a wireless module to facilitate communication with the inventory management system 150 and a display (e.g., a touch based display) to facilitate visible presentation to and interaction with the user. The portable device may store a unique identifier and provide that unique identifier to the inventory management system 150 and be used to identify the user. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device may operate in conjunction with or may otherwise utilize or communicate with one or more components of the inventory management system 150. Likewise, components of the inventory management system 150 may interact and communicate with the portable device as well as identify the user, communicate with the user via other means and/or communicate with other components of the inventory management system 150.

Generally, the inventory management system 150 may include one or more input/output devices, such as imaging devices (e.g., cameras) 208, projectors 210, displays 212, speakers 213, microphones 214, multiple-camera apparatus 227, illumination elements (e.g., lights), etc., to facilitate communication between the inventory management system 150 and/or the user and detection of items, events and/or other actions within the materials handling facility 200. In some implementations, multiple input/output devices may be distributed within the materials handling facility 200. For example, there may be multiple imaging devices, such as cameras located on the ceilings and/or cameras (such as pico-cameras) located in the aisles near the inventory items.

Likewise, the inventory management system 150 may also include one or more communication devices, such as wireless antennas 216, which facilitate wireless communication (e.g., Wi-Fi, Near Field Communication (NFC), Bluetooth) between the inventory management system 150 and other components or devices. The inventory management system 150 may also include one or more computing resource(s) 250, such as a server system, that may be local to the environment (e.g., materials handling facility), remote from the environment, or any combination thereof.

The inventory management system 150 may utilize antennas 216 within the materials handling facility 200 to create a network 202 (e.g., Wi-Fi) so that the components and devices can connect to and communicate with the inventory management system 150. For example, when the user picks an item 235 from an inventory area 230, a camera of the multiple-camera apparatus 227 may detect the removal of the item and the inventory management system 150 may receive information, such as image data of the performed action (item pick from the inventory area), identifying that an item has been picked from the inventory area 230. The event aspects (e.g., user identity, action performed, item involved in the event) may then be determined by the inventory management system 150.

Figure 3:
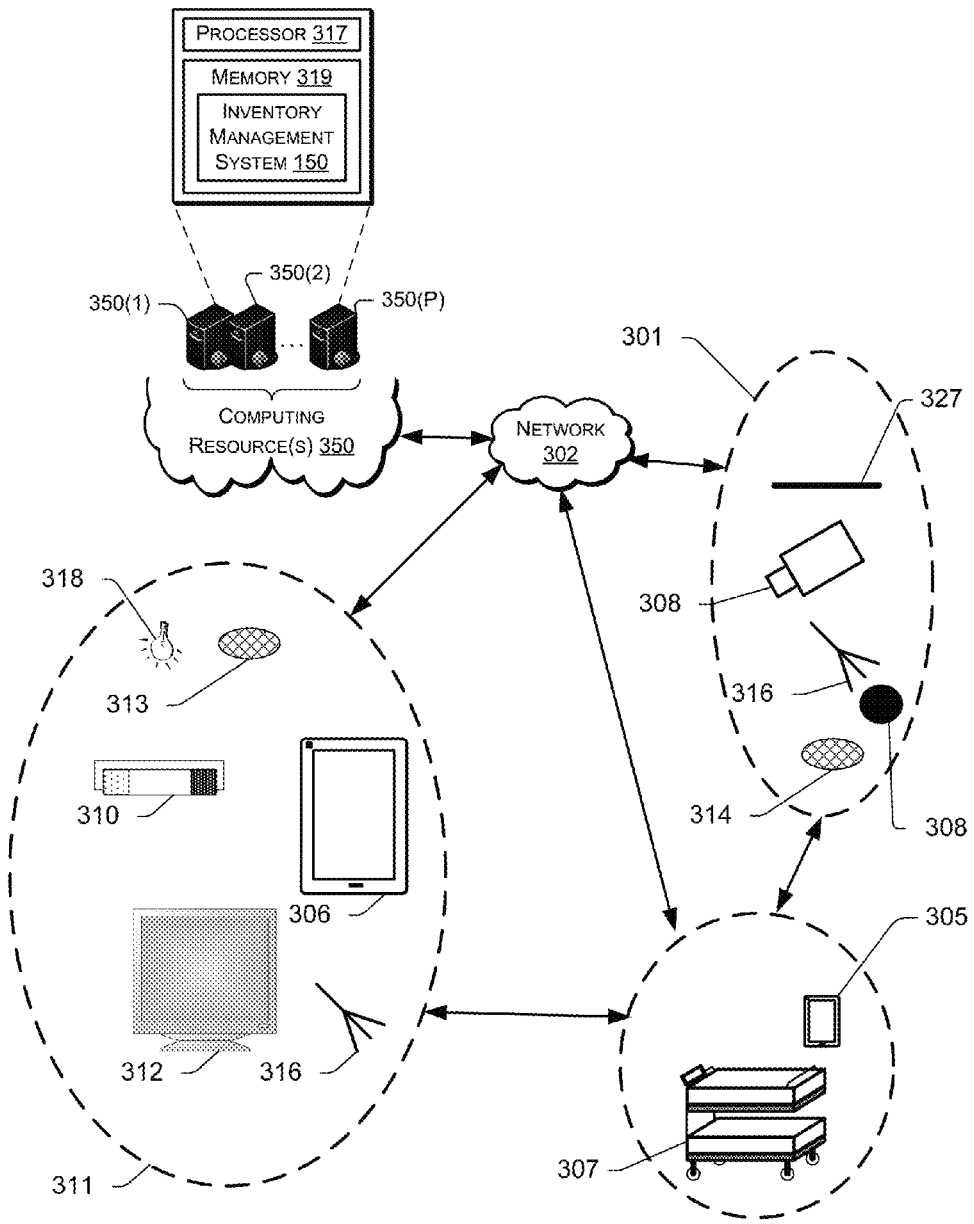
FIG. 3 shows components and communication paths between component types utilized in a materials handling facility of FIG. 1, according to an implementation.

FIG. 3 shows example components and communication paths between component types utilized in a materials handling facility 100, in accordance with one implementation. A portable device 305 may communicate and interact with various components of an inventory management system 150 over a variety of communication paths. Generally, the inventory management system 150 may include input components 301, output components 311 and computing resource(s) 350. The input components 301 may include an imaging device 308, a multiple-camera apparatus 327, microphone 314, antenna 316, or any other component that is capable of receiving input about the surrounding environment and/or from the user. The output components 311 may include a projector 310, a portable device 306, a display 312, an antenna 316, a radio (not shown), speakers 313, illumination elements 318 (e.g., lights), and/or any other component that is capable of providing output to the surrounding environment and/or the user.

The inventory management system 150 may also include computing resource(s) 350. The computing resource(s) 350 may be local to the environment (e.g., materials handling facility), remote from the environment, or any combination thereof. Likewise, the computing resource(s) 350 may be configured to communicate over a network 302 with input components 301, output components 311 and/or directly with the portable device 305, a user and/or the tote 307.

As illustrated, the computing resource(s) 350 may be remote from the environment and implemented as one or more servers 350(1), 350(2), . . . , 350(P) and may, in some instances, form a portion of a network-accessible computing platform implemented as a computing infrastructure of processors, storage, software, data access, and so forth that is maintained and accessible by components/devices of the inventory management system 150 and/or the portable device 305 via a network 302, such as an intranet (e.g., local area network), the Internet, etc. The server system 350 may process images of users to identify the user, process images of items to identify items, determine a location of items and/or determine a position of items. The server system(s) 350 does not require end-user knowledge of the physical location and configuration of the system that delivers the services. Common expressions associated for these remote computing resource(s) 350 include "on-demand computing," "software as a service (SaaS)," "platform computing," "network-accessible platform," "cloud services," "data centers," and so forth.

Each of the servers 350(1)-(P) include a processor 317 and memory 319, which may store or otherwise have access to an inventory management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., radio frequency, infrared, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4:
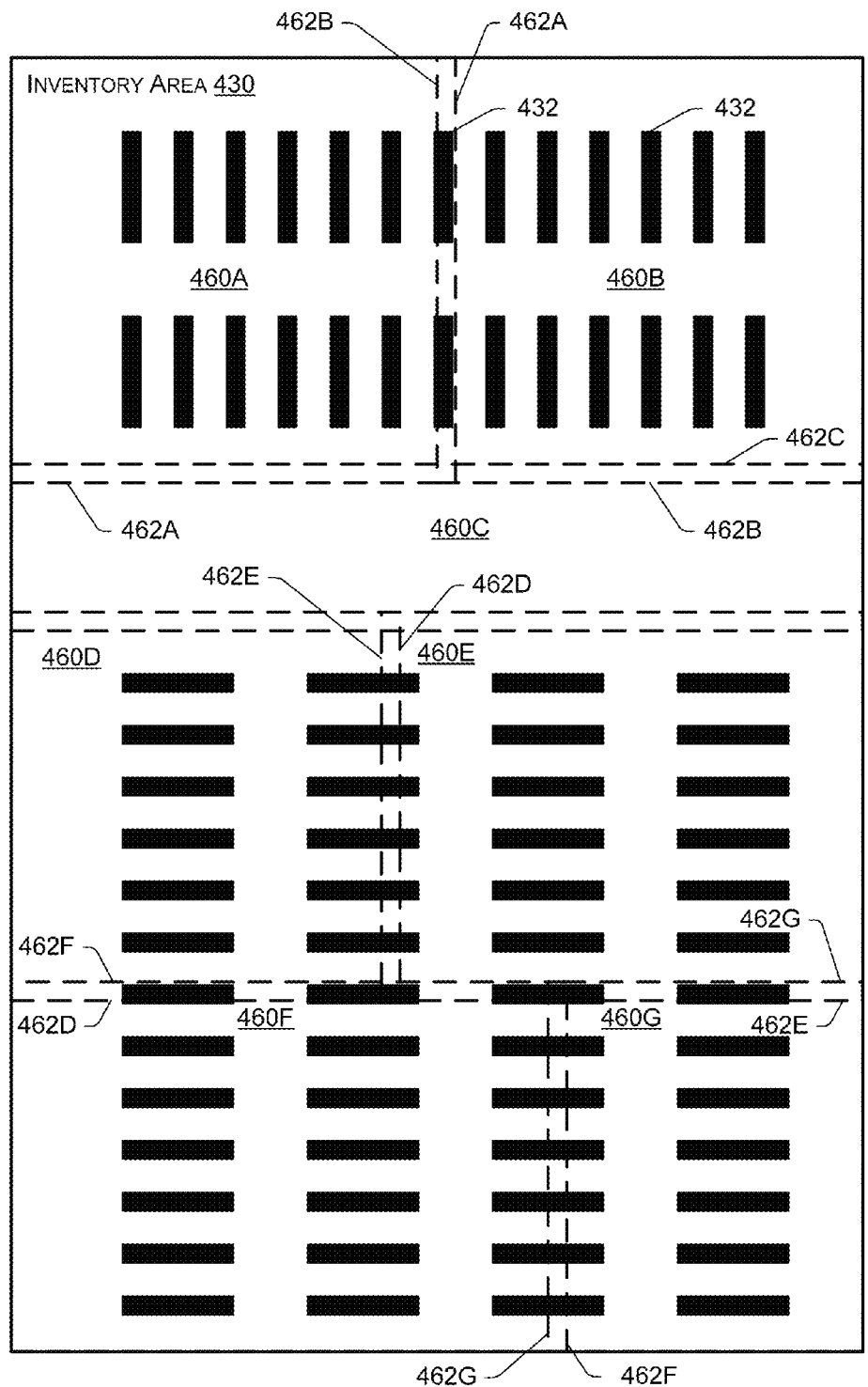
FIG. 4 is a block diagram of a top-down view of an inventory area within a materials handling facility segmented into clusters, according to an implementation.

FIG. 4 is a block diagram of a top-down view of an inventory area 430 within a materials handling facility segmented into clusters 460, according to an implementation. As materials handling facilities increase in size, the number of cameras needed to monitor the materials handling facility, likewise, increases. With typical monitoring systems that utilize a single computing system, as the number of cameras and/or image data increases, the speed of processing will likewise increase and/or the complexity, and, thus, accuracy of the algorithms used to process the images decreases. With the implementations described herein, any number of cameras may be supported using a single hierarchy of computing systems without significantly impacting speed or performance. For example, in some implementations, a single hierarchy of computing systems may be utilized to support up to five hundred cameras without decreasing the speed of image processing and/or sacrificing algorithm complexity or accuracy.

The camera hierarchy includes a first layer of cameras and computing components located within the materials handling facility that capture image data and reduce the image data, as discussed below with respect to FIG. 8. The reduced image data is then provided to a cluster processing system that processes the reduced image data to determine user patterns representative of users represented in the reduced image data. For each determined user pattern, a location of the user pattern with respect to the materials handling facility is determined and a session identifier is associated with the user pattern to aid in monitoring a location of the user pattern. Processing of the reduced image data is discussed further below with respect to FIG. 9.

The cluster processing system then provides the location information and session identifier for each determined user pattern to a cluster aggregation system that determines a user identifier corresponding to the user pattern. The cluster aggregation system may also determine an anticipated trajectory or direction of movement of each user. Cluster aggregation is discussed further below with respect to FIG. 10. The user identifier and location information may be provided to other services or systems, such as the inventory management system.

For materials handling facilities that include more than a maximum number of cameras that can be supported with a single hierarchy of computing systems, the cameras within the materials handling facility may be segmented into clusters 460 and additional cluster processing systems may be added, one for each additional cluster. Each of the cluster processing systems receive image data from a respective cluster of cameras, processes the received image data and provides user pattern location information to the cluster aggregation system. The cluster aggregation system consolidates the received information from each of the cluster processing systems and provides a unified representation of the materials handling facility that includes location information for each user within the materials handling facility.

As discussed further below with respect to FIG. 5, the cameras within the materials handling facility may be positioned at defined locations and orientations within the materials handling facility. For example, the cameras may be positioned a defined distance above a surface (e.g., floor) of the materials handling facility and facing straight down so that they have zero degrees of tilt in the vertical direction. Likewise, the cameras may be separated defined distances from one another so that the field of view of each camera collectively covers the entire surface, or a defined portion thereof, of the materials handling facility.

As part of the camera placement, the cameras may be positioned so that the boarders 462 between clusters of cameras are in areas of the materials handling facility that will not be frequently crossed by a user, or crossed with less frequency than other areas. For example, the borders 462A, 462B of clusters 460A and 460B are defined to cross along one or more inventory shelves 432. Likewise, borders 462A, 462B, 462C, at clusters 460A, 460B, 460C cross at the ends of the aisles. Similar positioning of borders 462D, 462E, 462F, 462G corresponding to clusters 460D, 460E, 460F, 460G are also illustrated. As illustrated, the size and/or shape of the clusters may vary within the materials handling facility. Likewise, the number of cameras associated with a cluster may also vary.

In some implementations, the size of the cluster is designed to be as wide and long as possible to reduce the frequency with which users cross cluster boundaries. Likewise, as illustrated in FIG. 5, the field of view of cameras of adjacent clusters may overlap, thereby causing the clusters to overlap. For example, the cameras may be positioned so that the field of view of adjacent cameras intersect and begin to overlap approximately six feet above the surface of the materials handling facility. Overlapping the field of view of cameras in adjacent clusters results in user patterns representative of users being detected in multiple clusters as the user moves from one cluster to another. Each cluster processing system will identify the user pattern and send the corresponding location information and session identifier for the cluster to the cluster aggregation system. The cluster aggregation system will determine that the location information for the two clusters overlap and determine that the two user patterns correspond to a single user and normalize the information to a single location and single user identifier.

The overlap of clusters increases the ability for the system to monitor a user as they move throughout the materials handling facility and transition between clusters. The cluster aggregation system consolidates this information so that other systems (e.g., the inventory management system) receive a single representation of the user's location within the materials handling facility.

Figure 5:
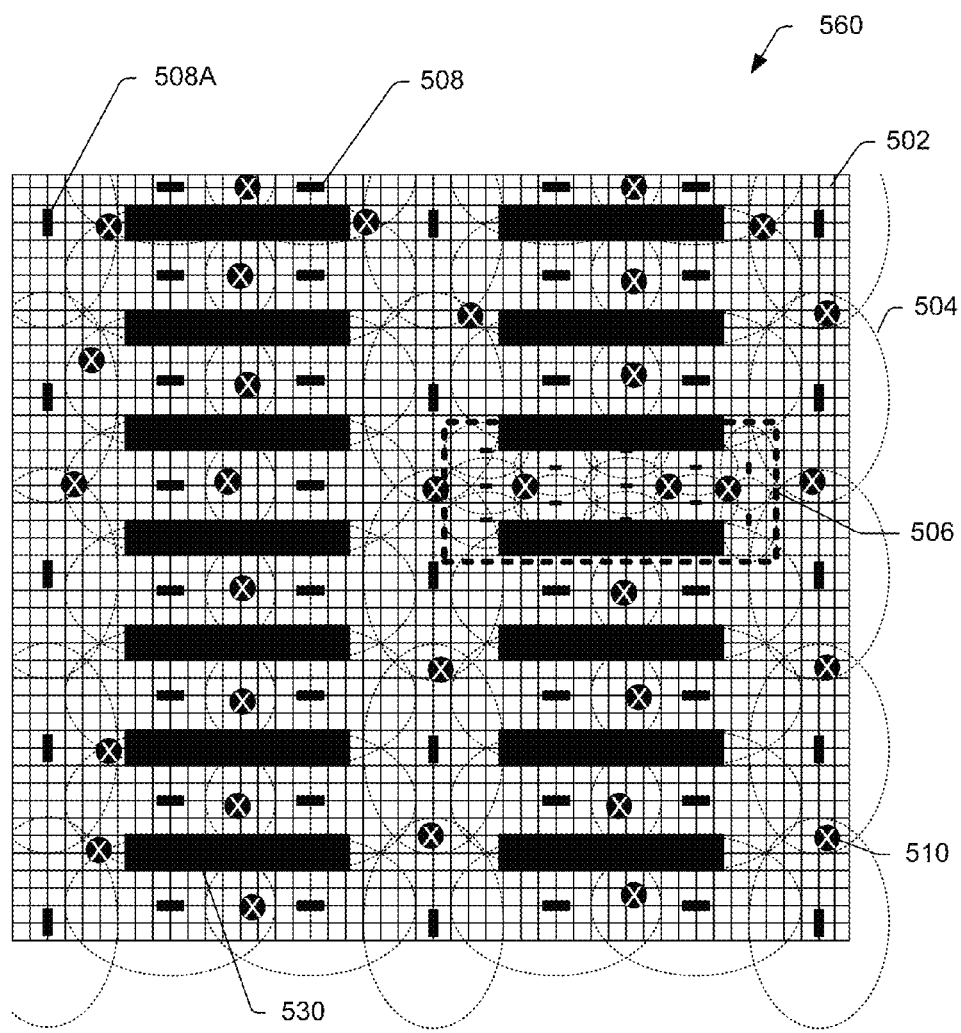
FIG. 5 is a block diagram of a top-down view of a cluster, according to an implementation.

FIG. 5 is a block diagram of a top-down view of a cluster 560, according to an implementation. Within each cluster 560 a plurality of cameras 508 may be positioned at defined locations so that the collective field of view of the cameras covers the entire surface of the portion of the materials handling facility corresponding to the cluster 560. In some implementations, a grid 502 system, physical or virtual, is oriented with the shape of the materials handling facility (e.g., oriented with the walls of the materials handling facility). The grid 502 may be utilized to attach or mount cameras within the cluster 560 at defined locations with respect to the physical space of the materials handling facility. For example, in some implementations, the cameras may be positioned at any one foot increment from other cameras along the grid.

By mounting the cameras at defined locations along the grid, the cameras can be associated with a physical coordinate within the materials handling facility. For example, if the cluster 560 represents the north-west corner of a materials handling facility, the grid 502 may be segmented into columns and rows and cameras may be positioned at any point on the grid. The columns and rows may be identified using any nomenclature, such as alphabetical characters for columns and numeric characters for rows. Each column:row intersection is at a defined physical location within the materials handling facility. For example, if the grid is positioned in one foot by one foot increments, the physical location within the materials handling facility of every grid intersection, and any connected cameras, is known. In this example, camera 508A is positioned at grid coordinate B:3, which corresponds to the horizontal coordinate of the camera being positioned approximately two feet by three feet from the origin (in this example the upper left corner) of the cluster.

Because the field of view 504 of the cameras 508 may not by circular, the cameras may be placed at defined directions (e.g., 0, 90, 180, 270 degrees). The direction of the camera may be determined based on the field of view 504 coverage of adjacent cameras and/or the layout of objects on the surface of the materials handling facility. For example, if the camera 508 is being mounted in an aisle between two inventory locations, the direction of the camera may be set so that the larger portion of the field of view 504 of the camera covers the length of the aisle.

The height of the cameras from the surface, the distance between camera placement and/or direction of the cameras 508 within the cluster 560 may vary depending on the layout of the materials handling facility, the lighting conditions in the cluster, the volume of users expected to pass through a portion of the cluster, the activities and/or volume of activities expected to occur at different locations within the cluster, etc. For example, cameras may typically be mounted every three to four feet in one direction and every four to five feet in another direction along the grid 502 so that the field of view of each camera overlaps, as illustrated in FIG. 5.

In some implementations, the height of the cameras from the surface and the distance between cameras may be set so that their fields of view intersect and begin to overlap approximately seven feet above the surface of the materials handling facility. Positioning the cameras so that the fields of view overlap at approximately seven feet will result in the majority of users being within a field of view of a camera at all times. If the field of view of the cameras did not overlap until they were approximately three feet above the surface, as a user moves between the fields of view, the portion of the user that is taller than approximately three feet would exit one field of view and not enter the next field of view until the user has moved into that range of the camera. As such, a portion of the user is not detectable as they transition between fields of view. While this example describes overlapping camera fields of view at approximately seven feet above the surface of the materials handling facility, in other implementations, the cameras may be positioned so that the fields of view begin to overlap at different heights (e.g., six feet, eight feet).

In some areas of the cluster, such as cluster area 506, cameras 508 may be positioned closer together and/or closer to the surface area, thereby reducing their field of view, increasing the amount of field of view overlap, and/or increasing the amount of coverage for the area. Increasing camera density may be desirable in areas where there is a high volume of activity (e.g., item picks, item places, user dwell time), high traffic areas, high value items, poor lighting conditions, etc. By increasing the amount of coverage, the image data increases, thereby increasing the likelihood that an activity or action will be properly determined.

In some implementations, one or more markers 510 may be positioned throughout the cluster and used to aid in alignment of the cameras 508. The markers 510 may be placed at any location within the cluster. For example, if the markers are placed where there is an overlap in the field of view of two or more cameras, the cameras may be aligned with respect to one another, thereby identifying the pixel overlap between the cameras and aligning the pixels of the cameras. The markers may be any identifiable indicator and may be temporary or permanent.

In some implementations, the markers 510 may be placed on the surface of the materials handling facility. In other implementations, the markers 510 may be placed on a visible surface of an inventory location 530 within the cluster. In still other implementations, the inventory location 530 itself may be utilized as a marker. Alternatively, or in addition thereto, one or more inventory items that are viewable by the cameras may be used as the marker 510. In still other examples, the surface of the materials handling facility may have a detectable pattern, marks, defects, etc., that can be determined and used as markers 510 to align cameras.

In some implementations, the markers 510 may be temporarily placed at locations within the materials handling facility and used to calibrate the cameras. During calibration, the cameras may be aligned with respect to one another by aligning the position of the markers 510 in each camera's field of view. Likewise, the field of view of each camera may be determined and associated with coordinates of the materials handling facility.

The cameras 508 of a cluster may obtain images (still images or video) and process those images to reduce the image data and/or provide the image data to other components. As discussed further below with respect to FIG. 8, image data for each image or frame may be reduced to only include pixel information for pixels that have been determined to have changed. For example, baseline image information may be maintained for a field of view of a camera and image data for an image may be compared to the baseline image information. The image data may be reduced by removing or subtracting out pixel information that is the same in the image data as the baseline image information. Image data reduction may be done by each camera. Alternatively, groups of cameras may be connected with a camera processor that processes image data from a group of cameras to reduce the image data of those cameras.

Figure 6:
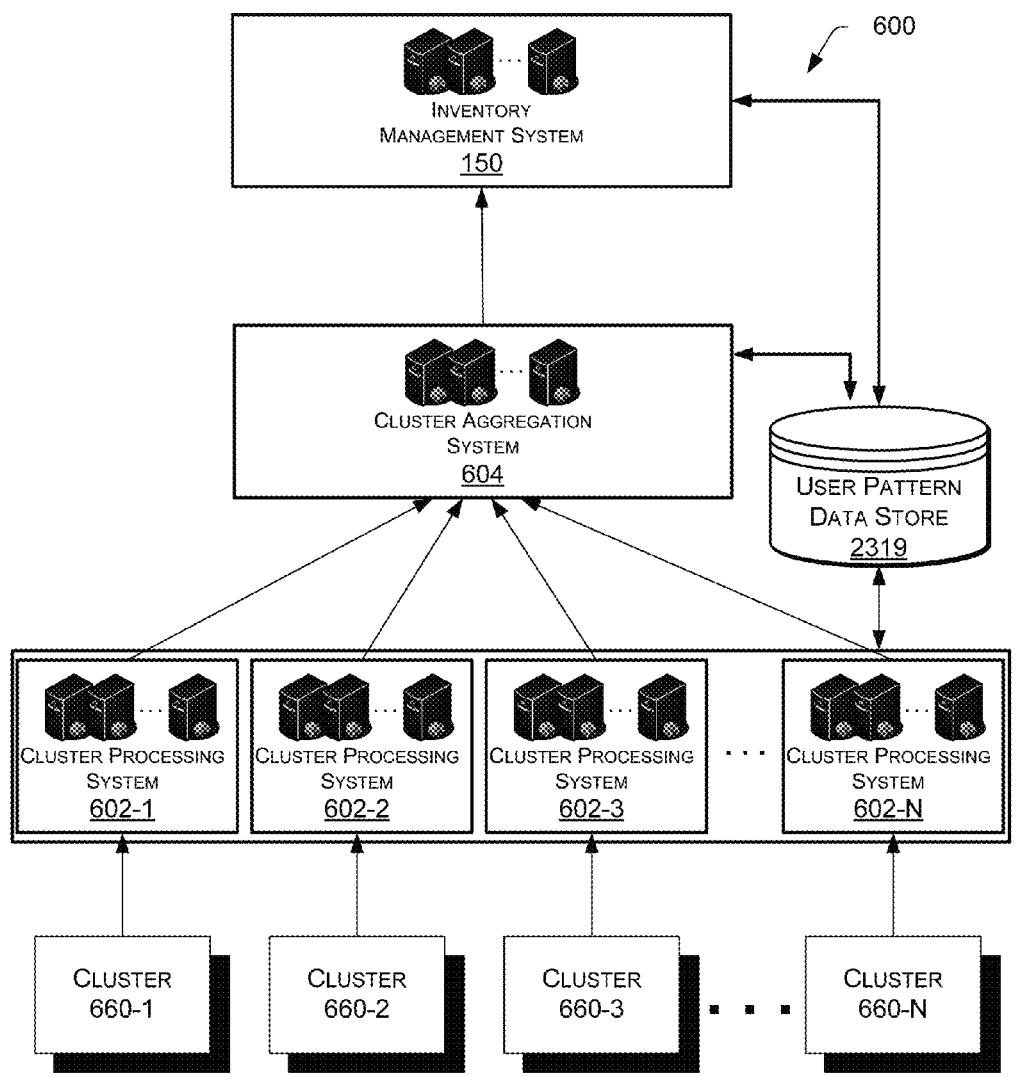
FIG. 6 is a block diagram of a camera hierarchy, according to an implementation.

FIG. 6 is a block diagram of a camera hierarchy 600, according to an implementation. The camera hierarchy 600 includes one or more clusters 660-1, 660-2, 660-3 . . . 660-N. Any number of cameras, up to a maximum supportable by the cluster processing system, may be included in each cluster 660. The maximum number of supportable cameras may be defined as the number of cameras that may be supported by a cluster processing system using a desired processing algorithm(s) without increasing the total processing time by more than a defined amount (e.g., 2%). Accordingly, the maximum number of cameras may vary based on the computation power and/or speed of the cluster processing system, the amount of image data provided by cameras of a cluster, the complexity and/or number of processing algorithms utilized to process the image data, etc. In some implementations, the maximum supportable number of cameras may be 500. Likewise, in some implementations, the number of cameras per cluster may vary between approximately 300 cameras and approximately 500 cameras.

Each camera and/or camera computing components may process image data to generate reduced image data. For example, baseline image information may be established for the field of view of each camera that identifies the temperatures, colors, shapes and/or depth information for objects (e.g., inventory locations, tables, work stations, surface area) that are typically within the field of view of the camera. As each image is obtained, the image data may be compared with the baseline image information to remove from the image data pixel information that is the same or similar in both the image data and the baseline image information. For example, the baseline image information may include pixel information for each pixel of image data that identifies the color values (RGB) of an object represented by the pixel, depth or distance of the object from the camera and/or the temperature of the object. The corresponding pixel information in the image data may be compared with the pixel information of the baseline image information to determine if the color values, depth, and/or temperature of the object has changed more than a tolerance threshold. Due to lighting changes, vibrations, temperature changes, etc., there may be some variation between the baseline image information and the image data. Such variations may fall below a threshold and not be considered as changes to the pixel information. The threshold may be any defined value and may be the same or different for different pixels, different cameras, different clusters, etc.

If the difference between the pixel information of the baseline image information and the corresponding pixel information of the image data is below the tolerance threshold, it may be determined that there has been no change at that pixel. If there is no change, the pixel information is removed from the image data. This comparison may be done for each pixel represented in the image data, thereby removing any image data that has not changed compared to the baseline image information. By removing image data that has not changed, the size and amount of the image data to be transmitted and processed is greatly reduced. In some implementations, if there is no change in any of the image data when compared to the baseline image information, the camera or camera computing component may send an empty image data file. The empty image data file may be used to notify the other processing systems that the camera is operational but there is no change in the image data. In other implementations, the camera and/or the camera computing component may not send any information, or may simply send an indicator acknowledging that the camera is operational.

As discussed above, the fields of view of cameras within a cluster may overlap with other cameras of the cluster. Image data may be sent for each field of view and processed by the cluster processing system 602, as discussed further below. Likewise, the fields of view on the perimeter of each cluster may overlap with the fields of view of cameras of an adjacent cluster.

Each cluster processing system 602-1, 602-2, 602-3 . . . 602-N may correspond with a cluster. In some implementations, there may be a one-to-one relationship between clusters 660 of a materials handling facility and a cluster processing system 602.

Each cluster processing system may be remote from the materials handling facility and may include one or more computing systems, such as a server system 350, that is configured to process reduced image data received from a corresponding cluster 660. For example, cluster processing system 602-1 may process reduced image data received from each camera of cluster 660-1. Cluster processing system 602-2 may process reduced image data received from each camera of cluster 660-2. Cluster processing system 602-3 may process reduced image data received from each camera of cluster 660-3. Any number of cluster processing systems may be established to support and process reduced image data from any number of clusters.

As discussed further below with respect to FIG. 9, each cluster processing system receives reduced image data from each of the clusters 660, and further reduces the data by generating a point cloud representative of that portion of the materials handling facility. The position of each pixel represented in the point cloud is aligned according to coordinates (horizontal and vertical) of the materials handling facility. A point cloud is a three-dimensional mapping of objects represented in the reduced image data. For example, the reduced image data includes pixel information from a camera at a known position in the materials handling facility. Based on the known position of the camera, each pixel can be associated with horizontal coordinates of the materials handling facility. Likewise, the reduced image data may include depth information that can be utilized as the vertical component for the point cloud.

Utilizing the information from the generated point cloud, the cluster processing system can determine user patterns. For example, the vertical component of pixels represented in the point cloud identify changes in the height of a location within the cluster. Adjacent pixels (e.g., pixels of the same or similar area generated from prior images) may also be considered and, if there is a sufficient number of adjacent pixels with a similar change or increase in the vertical direction, it may be determined that those pixels represent a user pattern. For example, the user patterns 1104-1116 (FIG. 11) may be determined based on a change in the vertical component of a group of pixels that make up the user pattern.

As discussed further below, in some implementations, the size, shape, color, temperature, etc., of the image data may also be considered in determining a user pattern. For example, the cluster processing system 602 may consider information stored in the user pattern data store 2319 from prior point clouds generated from prior reduced image data. For example, if a user pattern is determined in a prior point cloud based on reduced image data from the cluster at a similar location and/or having a similar size, shape, height, color, temperature, etc., that information may be stored in the user pattern data store 2319 and utilized to determine the user pattern in the current reduced image data. In still other implementations, the cluster processing system may utilize information received from the cluster aggregation system 604 to determine user patterns. For example, if a user is entering the field of view of cameras on the edge or perimeter of a cluster, the depth information for pixels of those cameras may begin to change. The cluster aggregation system 604 may provide information to the cluster processing system 602 identifying that a user pattern is expected to enter the cluster at defined locations based on information from other, adjacent clusters.

For each determined user pattern, the cluster processing system 602 generates location information and assigns a session identifier to the user pattern. The location information may include, for example, a center point of the user pattern, a particular aspect of the user pattern (e.g., the user's head and/or shoulders), etc. The location information and corresponding session identifier is provided to the cluster aggregation system 604.

While the examples described herein discuss the use of depth or vertical information for generating point clouds and determining user patterns, in other implementations, other information may be utilized in addition to or as an alternative to depth information for determining user patterns. For example, temperature information or heat signatures may be determined from reduced image data and utilized to determine a location of a user pattern within the materials handling facility. In another example, color changes may be utilized to determine user patterns.

The cluster aggregation system 604 receives from each of the cluster processing systems 602 location information and session identifiers for each of the determined user patterns. As discussed in further detail below with respect to FIG. 10, the cluster aggregation system aggregates the information obtained from each of the cluster processing systems and generates a unified representation of the materials handling facility, determines users corresponding to each user pattern and provides that information to other systems, such as the inventory management system 150.

In one implementation, the cluster aggregation system 604 may utilize the received location information for each user pattern and determine user patterns received from different cluster processing systems that overlap and/or represent the same user. As discussed above, the field of view of cameras within adjacent clusters may overlap to aid in monitoring the location of a user as they move through the materials handling facility. When the user moves between clusters, both cluster processing systems will provide user pattern location information for a period of time. The cluster aggregation system 604 receives this information and determines that the two user patterns are to be associated with a single user.

Likewise, for each user pattern, location information, and session identifier, the cluster aggregation system 604 may determine a user identifier. The user identifier may correspond to the user represented by the user pattern. In some implementations, the cluster aggregation system 604 may maintain a session identifier mappings data store 2321 (FIG. 23) that includes a mapping relationship between the session identifier(s) assigned by the cluster processing systems and the corresponding user identifiers. As each series of user location information and session identifiers is received from the cluster processing systems 602, the cluster aggregation system 604 correlates the session identifiers with the user identifiers and updates the location of the user within the materials handling facility.

The cluster aggregation system 604 may then provide user identifiers, location information and/or user pattern information for each user located within the materials handling facility to other systems, such as the inventory management system 150. For example, the inventory management system 150 may detect an action, such as an item pick, at an inventory location within the materials handling facility. In detecting the item pick, the inventory management system 150 may query information provided by the cluster aggregation system 604 to determine a user identifier having location information corresponding to the location of the detected action (e.g., item pick). Likewise, the user pattern may be utilized along with additional information (e.g., arm tracks), as discussed below, to determine the user that performed the action.

Figure 7:
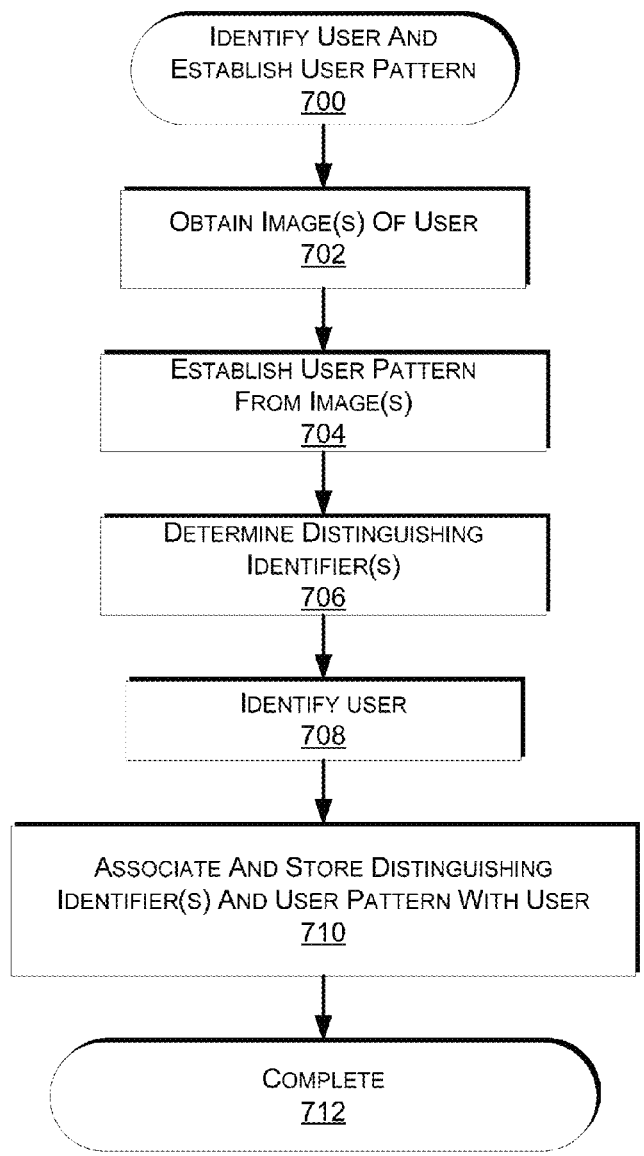
FIG. 7 is a flow diagram of an example process for identifying a user and establishing a user pattern, according to an implementation.

FIG. 7 is a flow diagram of an example process 700 for identifying a user and establishing a user pattern, according to an implementation. The example process of FIG. 7, and each of the other processes and sub-processes discussed herein, may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine. Likewise, one or more of the operations may be considered optional.

The example process 700 begins by obtaining an image of a user as they arrive or enter the materials handling facility, as in 702. For example, in some implementations, there may be one or more dedicated check-in or entry locations. As the user arrives at the check-in location or passes through the entry location, one or more images of the user may be obtained. In some implementations, images of the user may be obtained from overhead with a camera posited above the user and oriented straight down, similar to the positioning discussed above for cameras of a cluster.

For example, a camera may be positioned at a defined location within the materials handling facility at a known height. When the user is located in the field of view of the camera, an image of the user may be obtained. The corresponding image data may include RGB color information for each pixel, depth information, temperature information, etc.

Utilizing the obtained image, a user pattern representative of the user is established, as in 704. For example, the image data may be processed to determine a height, size, and/or shape of the user pattern that is representative of the user. In some implementations, a maximum height of the user may be determined along with a size and/or shape of the user's head and/or shoulders. In some implementations, the image data may also be processed to determine any distinguishing identifiers that may aid in monitoring the location of the user, as in 706. For example, if the user is wearing a bright colored shirt (e.g., yellow shirt), the color of the shirt may be determined to be a distinguishing identifier that may be utilized to aid in monitoring the location of the user within the materials handling facility. As discussed further below, as the user moves throughout the materials handling facility, the user pattern information may be utilized to monitor the location of the user.

In addition to generating a user pattern, the user is also identified, as in 708. User identification may be accomplished using a variety of techniques. For example, images of the face of the user may be obtained and processed using facial recognition algorithms, pattern matching algorithms, or the like, to identify the user. Alternatively, or in addition thereto, the user may provide an identification (e.g., user name, password), the user may present an identifier (e.g., identification badge, card), a RFID tag in the possession of the user may be detected, a visual tag (e.g., barcode, bokode, watermark) in the possession of the user may be detected, biometrics may be utilized to identify the user, etc.

Upon user identification, the user pattern and any distinguishing identifiers are associated with a user profile and corresponding user identifier, as in 710. Likewise, a session identifier may be generated and associated with the user profile. In some implementations, the session identifier may be utilized to identify the user profile and the user identifier may be provided by the cluster aggregation system to other systems. In some implementations, the actual identity of the user may not be discernable from the session identifier and/or the user identifier. In such an implementation, only systems that need access to the actual user information may be able to use the session identifier and/or user identifier to obtain access to user information.

Upon user identification and association with a user profile, the example process 700 completes, as in 712.

Figure 8:
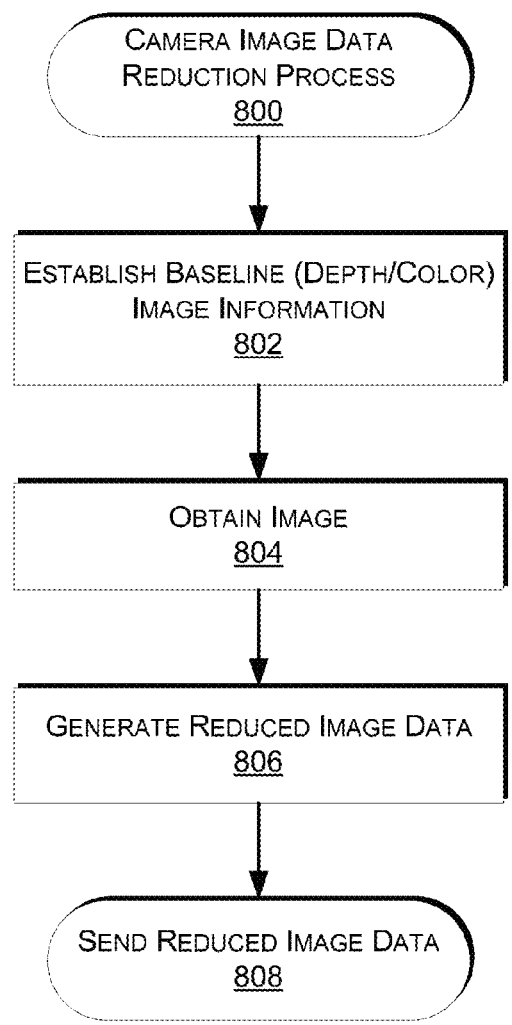
FIG. 8 is a flow diagram of an example image data reduction process, according to an implementation.

FIG. 8 is a flow diagram of an example camera image data reduction process 800, according to an implementation. The example process 800 may be performed for each camera within a cluster and/or for each cluster. In some implementations, the example process 800 may be performed using computing components of the camera itself as part of the image capture process. In other implementations, obtained images may be sent from the camera to a camera computing component and the camera computing component may perform the process 800. Cameras may be connected to the camera computing component via wired or wireless communication paths. In some implementations, the cameras may be connected with a camera computing component over a wired Ethernet connection or a wired universal serial bus (USB) connection. In addition to providing image data to the camera computing component over such a wired connection, the camera may be powered by the camera computing component and receive power over the wired connection (e.g., power over Ethernet or power over USB).

Multiple cameras of a cluster may provide image data to a camera computing component for processing. Each camera computing component may support, for example, twenty four cameras, receive image data from those cameras and generate reduced image data for each camera, in accordance with the example process 800. In other implementations, more or fewer cameras may be supported by a camera computing component.

The example process 800 begins by establishing baseline image information for each location of the materials handling facility, as in 802. For example, baseline image information may include the depth information for each location within the materials handling facility with respect to a camera, color information, temperature information, etc. In one implementation, each camera may obtain images and determine from those images areas within the field of view that remain unchanged in the image. These areas may be established as baseline image information. This may be done at initiation of the system when there is no activity in the materials handling facility and/or periodically.

For example, when there is no activity in the materials handling facility (e.g., no users), the example process 800 may be performed and the baseline image information may include a representation of the field of view of each camera when there is no activity. In other implementations, the example process 800 may be performed while there is activity in the materials handling facility. For example, a series of image data from a camera may be processed to determine locations that are not changing. This may correspond to baseline image information obtained when the materials handling facility has no activity or it may vary with time. For example, if a user picks an item from an inventory location and then returns the item to the inventory location but does not place it entirely back onto a shelf of the inventory location, a portion of the item may be included in images obtained by a camera. The change in the depth information for the pixels corresponding to the location of the item will change compared to an existing baseline image. However, because the item is stationary, the depth information for each subsequent image data will be similar. After a defined period of time (e.g., five minutes), the example process may determine that the item should be considered part of the baseline and the depth information for the pixels that represent the item may be updated so that the depth information corresponding to the item is part of the baseline.

In addition to establishing a baseline, images may be periodically obtained by the cameras, as in 804. As discussed above, the cameras may obtain a series of still images and/or ongoing video from which frames are extracted as image data. For each obtained image, the image data is compared with the baseline image information and pixels with the same or similar information are removed. The remaining pixels, the pixels having information that is different than the baseline image information, are saved to generate reduced image data, as in 806. In some implementations, pixel information (e.g., color, depth, temperature) may be considered to be the same if the difference between the baseline image information and the current image data are within a tolerance threshold. Due to lighting changes, vibrations, temperature changes, etc., there may be some variation between the baseline image information and the image data. Such variations may fall below a tolerance threshold and not be considered as changes to the pixel information. The tolerance threshold may be any defined value and may be the same or different for different pixels, different cameras, different clusters, etc.

The reduced image data is then sent from the cluster, as in 808, and the example process completes.

Figure 9:
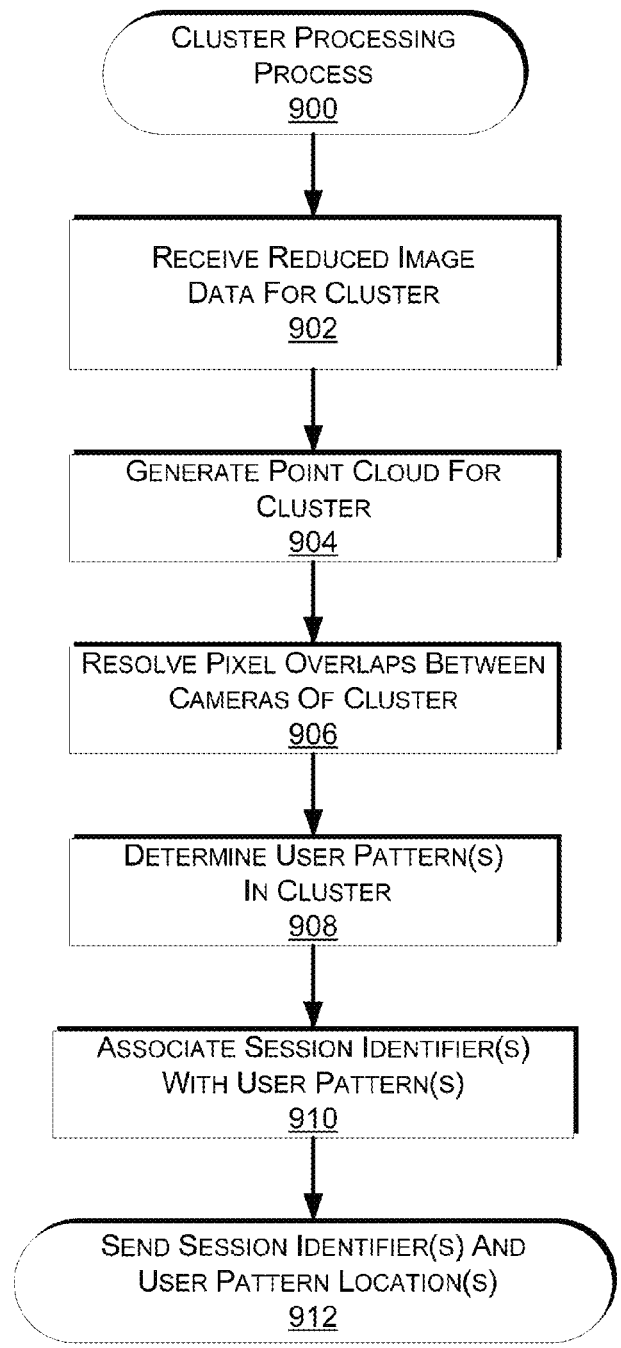
FIG. 9 is a flow diagram of an example process for processing image data for a cluster, according to an implementation.

FIG. 9 is a flow diagram of an example process 900 for processing image data for a cluster, according to an implementation. The example process 900 begins by receiving reduced image data from cameras of a cluster and/or from camera computing components, as in 902. The reduced image data may be received over a wired and/or wireless communication path. In some implementations, the cluster processing system(s) that perform the example process 900 may be remote from the corresponding cluster and/or remote from the materials handling facility. As discussed above, there may be a one-to-one relationship between clusters and cluster processing systems and each cluster processing system may perform the example process 900 for a corresponding cluster, but independent of other clusters and other cluster processing systems.

For each set of reduced image data, a point cloud is generated, as in 904. For example, the reduced image data for each camera may be associated with a defined physical location or coordinate (horizontal and vertical) within the materials handling facility. Because the location, orientation and field of view of each camera is known, the horizontal location of each pixel of information from the field of view of the camera can be correlated with a horizontal position within the materials handling facility. Likewise, the depth information included in the pixel information may be utilized as the vertical component for the pixel. Utilizing the horizontal and vertical components for each pixel included in the reduced image data received from each camera of the cluster, a point cloud may be generated.

In addition to generating a point cloud, the example process 900 may also identify any pixels that are overlapping and/or assigned to a same horizontal coordinate, as in 906. As discussed above, the field of view of one or more cameras within a cluster may overlap. The overlapping fields of view may result in pixel information from corresponding image data being assigned to a same horizontal location within the materials handling facility. However, because the cameras are potentially different distances from the overlapping horizontal locations, the depth information (distance of an object from the camera) may be different. The example process 900 resolves the overlap by selecting one set of the pixel information as representative of the physical location. For example, the example process may select the pixel information that has a larger vertical component. Alternatively, the example process may select the pixel information that has a smaller vertical component. In still another example, the example process 900 may select pixel information that is an average of the vertical component between the overlapping pixel information. In still another example, the example process 900 may consider the vertical component of adjacent pixels and select the pixel information having a vertical component that is closest to adjacent pixels.

Based on the point cloud, one or more user patterns are determined, as in 908. User patterns may be determined based on the size and/or shape of objects identified in the point cloud. For example, a user pattern may be determined if a defined number of adjacent pixels represented in the point cloud have a similar vertical component. Alternatively, if a defined number of pixels represented in the point cloud form a defined shape (e.g., a circle representative of a user's head, shoulders), a user pattern may be determined. In some implementations, the example process 900 may consider point clouds generated from multiple received sets of reduced image data and determine a user pattern based on information represented in point clouds generated from each set of reduced image data. For example, if the point cloud information identifies an object having a defined vertical component and/or shape that appears in multiple point clouds and is moving in a horizontal direction, a user pattern may be determined.

Referring again to FIG. 11, illustrated are several user patterns 1104-1116 at different locations and orientations within an inventory area 1130. As illustrated, each user pattern includes defined shapes and has a user pattern boundary. For example, user pattern 1104 includes a defined shape 1118 of the user's head and defined shapes of the user's left shoulder 1120 and the user's right shoulder 1122. As discussed below, the orientation of the user may be determined based on the position, posture, movement, etc. of the user over a series of frames or during a period of time.

In addition to the defined shapes, the user pattern may include a user pattern boundary 1124 representative of the area in which the user pattern is likely to be identified as the user moves. For example, as the user moves, bends, leans, etc. the shape of the user, when viewed from the perspective of the overhead cameras, will change. The user pattern boundary 1124 is representative of the area around a centerpoint of the user pattern in which the user pattern may be identified as the user moves.

Figure 18:
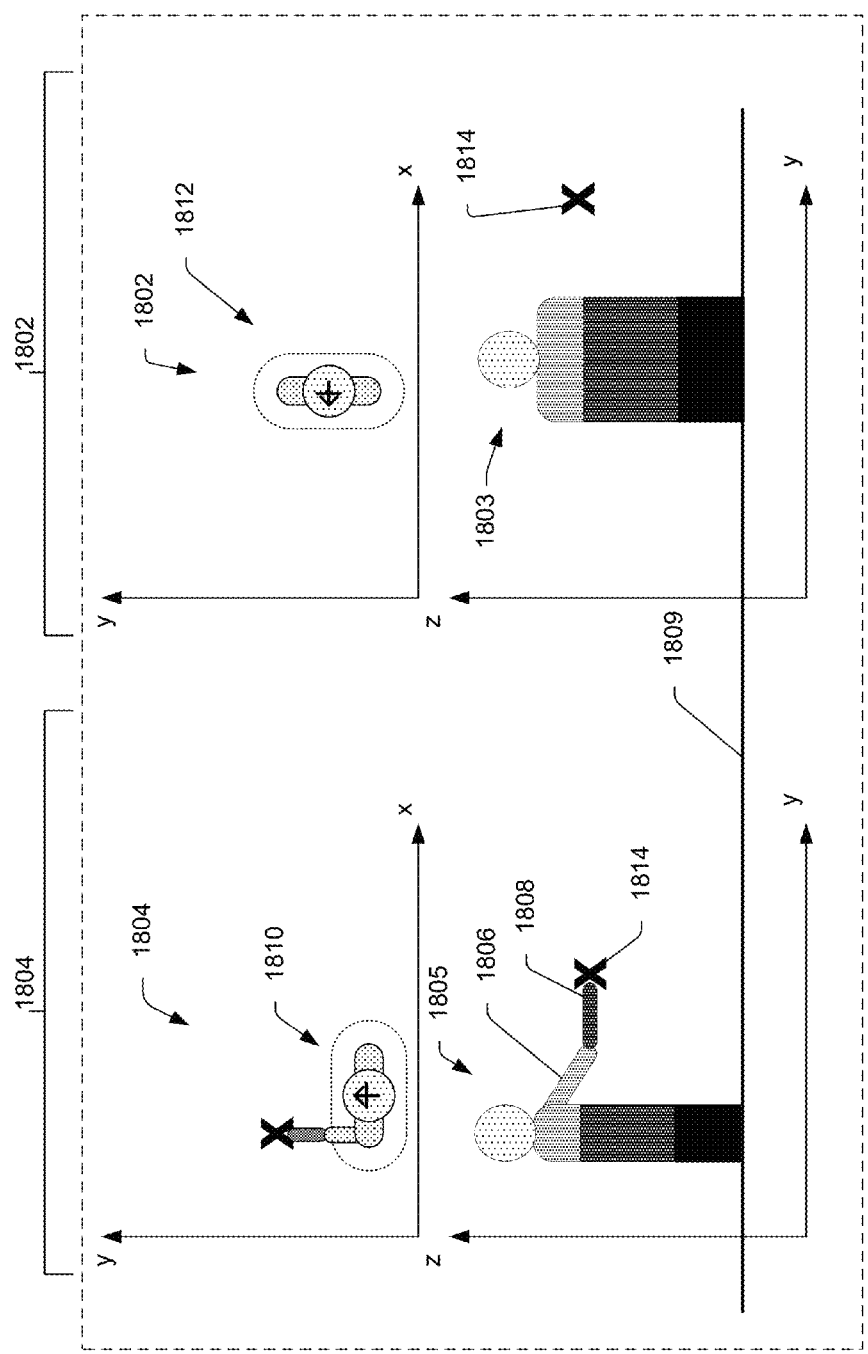
FIG. 18 is a block diagram of a two-dimensional depth view for disambiguating user patterns, according to an implementation.

As illustrated and discussed further below, a user may also extend an arm when they are performing an event (e.g., action). The extension of the user's arm, such as the arm 1126 may be detected as the user reaches out for an item, for example. As illustrated, the user's arm 1126 may extend beyond the user pattern boundary 1124. The image information may be processed to determine the trajectory of the arm, whether the user is holding an item, the direction of movement of the arm, the color of the arm (e.g., if the user is wearing a shirt) and/or other information that may be utilized to associate the arm with the user pattern. FIG. 18 provides additional discussion regarding the linking of an arm and/or determining an arm trajectory.

Returning to FIG. 9, for each user pattern, a session identifier may be associated, as in 910. A session identifier may be any identifier, such as a random number. The session identifier may be generated by the example process 900 or associated with the user pattern based on prior information and/or based on information provided by the cluster aggregation system. For example, when the user is first identified, a user pattern determined, and a session identifier associated therewith, according to the example process 700, the location of that user pattern may be continuously monitored using the implementations discussed herein. As the user pattern moves throughout the materials handling facility, location information may be maintained and the session identifier may continually be associated with that location. When the example process 900 determines a user pattern, it may receive information that provides location information and a session identifier that is at or near the location of the determined user pattern. That information may be utilized to determine that the session identifier is to be associated with the determined user pattern.

Location information for the user pattern and the associated session identifier are then sent to the cluster aggregation system, as in 912. In some implementations, the location information may identify all locations determined to be associated with the user pattern. In other implementations, a center point of the user pattern and/or a center point within a particular shape of the user pattern may be utilized as the location information. For example, a circular shape (e.g., user's head) may be determined in the user pattern and a center point within the circular shape may be determined and utilized as location information representative of the user pattern.

Processing reduced image data at each cluster processing system utilizing the example cluster processing process 900 results in the data being further reduced. Rather than providing images and/or location information for clusters, the cluster processing process may only provide session identifiers and location information for user patterns determined from the received reduced image data.

Figure 10:
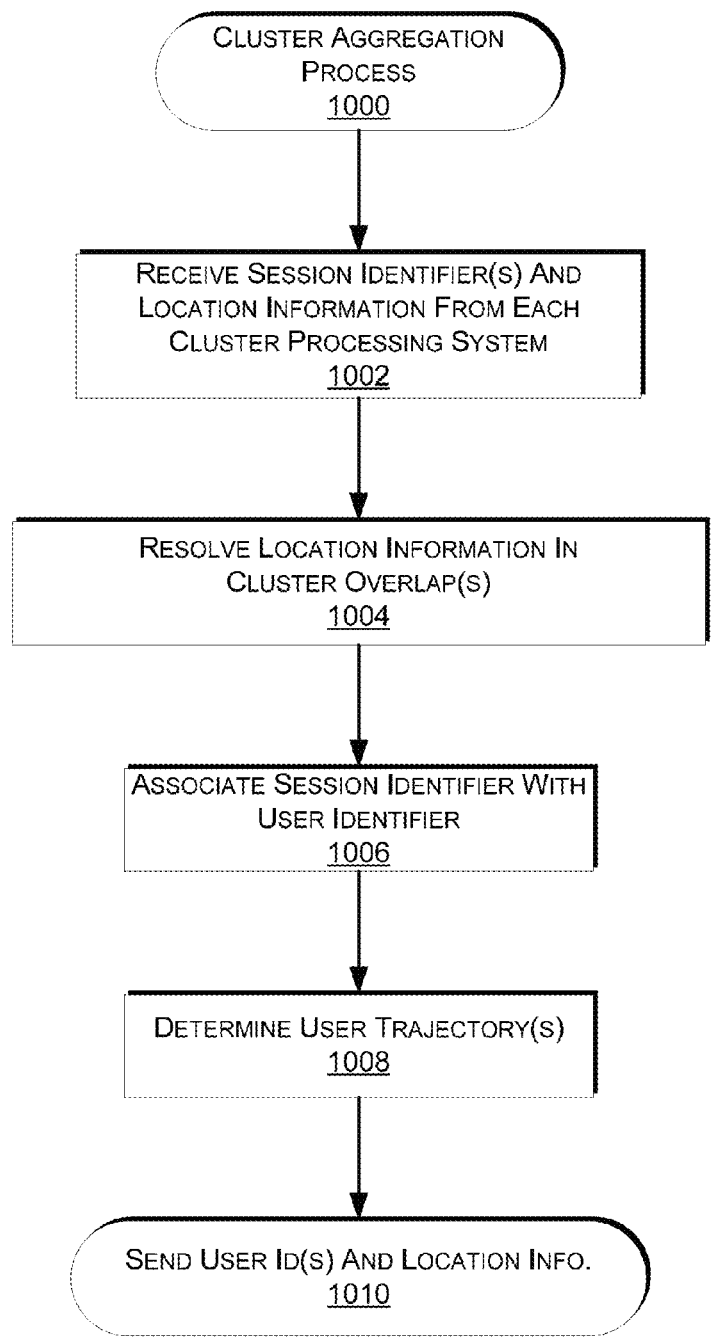
FIG. 10 is a flow diagram of an example cluster aggregation process, according to an implementation.

FIG. 10 is a flow diagram of an example cluster aggregation process 1000, according to an implementation. The example process 1000 begins upon receipt of session identifiers and user pattern location information from each cluster processing system, as in 1002. As discussed above, each cluster processing system that processes image data from cameras of a materials handling facility provides session identifiers and location information for determined user patterns to a cluster aggregation system. The cluster aggregation system performs the example process 1000.

Upon receipt of location information and session identifiers, the example process determines and resolves any overlaps in location information that are identified in locations of overlapping clusters, as in 1004. Similar to cameras within a cluster, cameras at the perimeter of adjacent clusters may have overlapping fields of view. When a user moves between clusters, they will be identified by each cluster for the portion of the overlap and, as such, each cluster processing system will provide a session identifier and location information for the detected user pattern. Because the location information from each cluster may vary slightly due to the cameras being at different distances/perspectives, the example process 1000 determines overlapping and/or similar location information for user patterns reported from different clusters and determines if the two reported session identifiers and location information correspond to the same user. For example, the example process 1000 may consider location information and session identifiers from prior points in time to determine a trajectory of a user and, based on that trajectory, determine if the two overlapping location information correspond to the same user.

For each session identifier or resolved session identifier and corresponding location information, the example process may associate the session identifier with a user identifier, as in 1006. The user identifier may be any unique identifier that is utilized to monitor the location of the user. For example, the user identifier may be the user identifier determined or established as part of the example process 700. Because the cluster aggregation system and the corresponding example process 1000 generate a complete view of users throughout the materials handling facility, the example process 1000 continually receives location information for the user pattern of the user from the time the user is identified. Utilizing this information, the example process can maintain information as to which session identifiers generated by the cluster processing systems correspond to which user identifiers.

In addition to determining and resolving overlapping location information for a user, the example process 1000 may determine an anticipated trajectory for each user based on the currently received location information and previously received location information for the user, as in 1008. For example, if a series of reported location information for a session identifier identifies that the user is moving down an aisle, the example process 1000 may determine that the user is likely to continue moving in that direction down the aisle.

Finally, the example process 1000 may provide and/or make available location information for each user identifier corresponding to each user within the materials handling facility and the corresponding user identifier, as in 1010. For example, the example process 1000 may provide location information for each user identifier to the inventory management system 150.

FIG. 11 is a block diagram of an inventory area 1130 and multiple user patterns 1104-1116, according to an implementation. As discussed above, the user patterns 1104-1116 are determined by processing image information obtained from cameras located above the inventory area 1130. As users move throughout the materials handling facility, they may interact with items, pick items from inventory locations, place items at inventory locations, move items, and/or perform other events. An event may be any interaction or action between a user and an item. For example, an event may be an item action, such as an item pick, an item place, an item interaction, such as a user moving an item, or the like.

Each time an event is detected, an event time and an event location are generated. Event time and event location are representative of the location of where the event was detected and a time, or time duration, during which the event was detected. The event location may be a specific location identified by three coordinates of a coordinate space or an area in which the event occurred. For example, the event location may include a first location at which the event initiated (e.g., when the user reaches their hand into an inventory location) and an second location at which the event ended (e.g., when the user removes their hand from the inventory location) and an area between the first location and the second location may be included as the event location. In another example, the event location may include an identification of an inventory location at which an event was detected.

Any number of the input components discussed above with respect to FIGS. 2-3 may detect and report an occurrence of an event. For example, a pressure sensor may detect an event when an item is picked from an inventory location, placed at an inventory location, and/or moved at an inventory location. An event may be detected based on a processing of images obtained from a camera, such as a camera located above the inventory area, a camera located on an inventory shelf, etc.

When an event is detected, the time of the event, the item involved in the event, and the user involved in the event are determined. For example, if the event is an item pick from an inventory location, the time of the event or the event time duration may be the time during which it was determined that the item was picked form the inventory location. The time window of an event may include the determined event time or time duration and also may include a defined period of time before and/or after the determined event time or event time duration. For example, the event time window may include thirty seconds before and thirty seconds after a determined event time or event time duration.

The item may be identified based on a known list of items at the inventory location where the event occurred, a change in a weight at the inventory location, a RFID reader detecting a movement, removal, or addition of an RFID tag, a visual identifier, such as a bar code scanner, detecting a visual tag (e.g., barcode) as an item is picked or placed, etc.

To identify the user involved in the event, the user patterns near the event location during a time window of the event are determined. In some implementations, the user and/or user patterns may be determined without information as to the item involved in the event. For example, as discussed below, the user pattern may be determined based on the determined event time or the event time duration along with the event location.

A user pattern may be considered a candidate user pattern if it is located with a defined distance 1128 of an event location during the event time window. The defined distance 1128 may be any defined value and may vary for different users, different items, different inventory locations, etc. For example, the defined distance may be five feet from the event location. In some implementations, the defined distance may only include distances in which user interaction with the item is possible. For example, a defined distance may only consider a user pattern located in the same aisle as the event location. As shown in FIG. 11, even though the defined distance 1132 would potentially include user patterns 1114, 1116, if the defined distance 1132 were a full circle around the event location, because user patterns 1114, 1116 are not in the same aisle as the event location, they are not considered to be within the defined distance 1132 of the event location.

In some implementations, if there is only a single user pattern detected within the defined distance during the event time window, the user associated with the user pattern may be determined to be involved in the event. However, in other implementations, the user pattern and/or images relating to the event may be processed to confirm that the user corresponding to the user pattern was involved in the event. Processing a user pattern to confirm an association with the event is discussed in further detail below with respect to FIGS. 12-15. If there are multiple candidate user patterns for an event, the implementations described herein may disambiguate between candidate user patterns and determine which user pattern is to be associated with the event. Additional discussion for disambiguating between multiple candidate user patterns is discussed below with respect to FIGS. 16-22.

Figure 12:
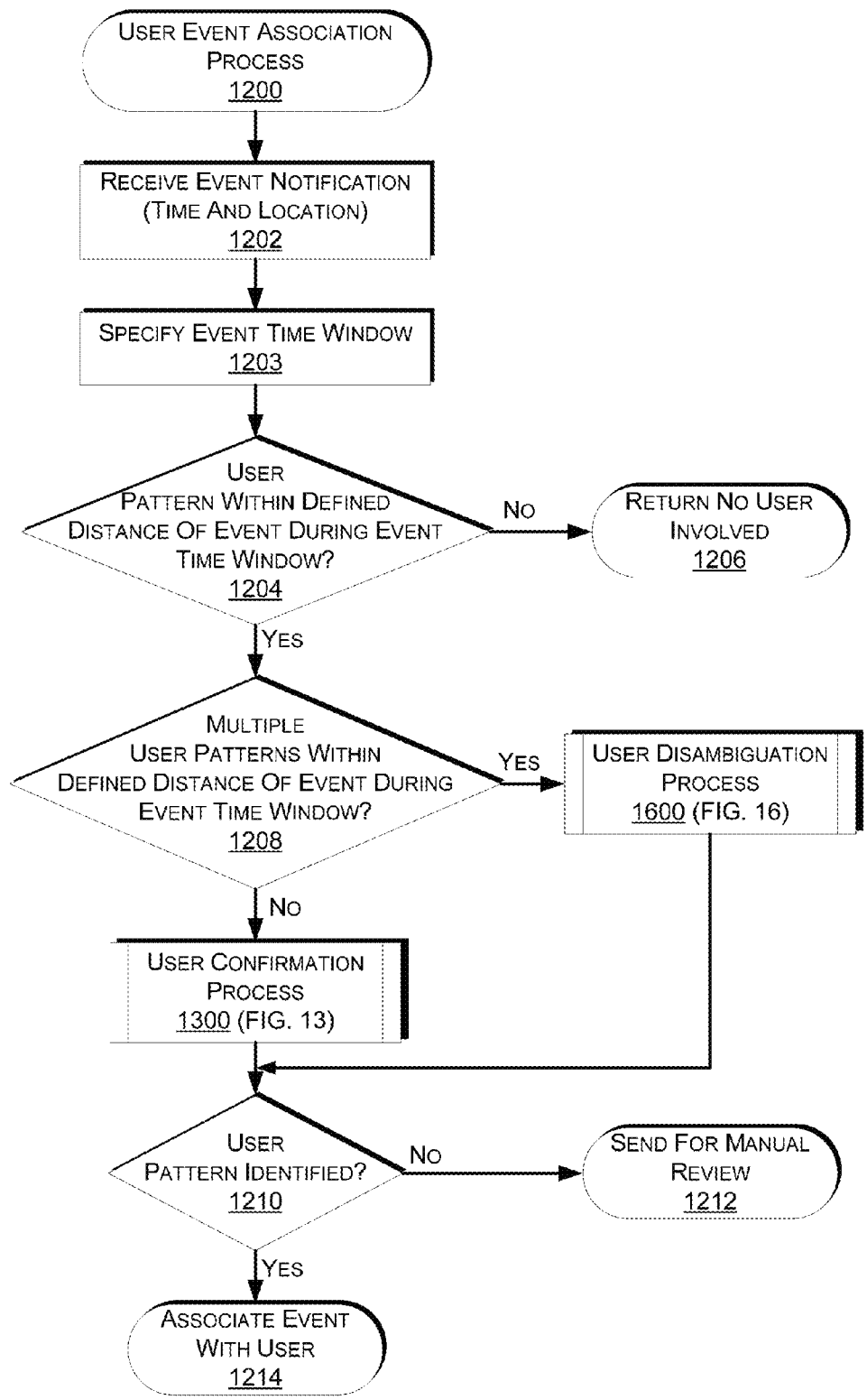
FIG. 12 is a flow diagram of an example user event association process, according to an implementation.

FIG. 12 is a flow diagram of an example user event association process 1200, according to an implementation. The example process 1200 starts upon receipt of an event notification, as in 1202. An event notification includes at least an event location and an event time or event time duration. As discussed above, an event notification may be generated when an event is detected by one or more input components within the materials handling facility. For example, an event notification may be generated when a change in a weight at an inventory location occurs, representative of an item pick (decrease in weight) or an item place (increase in weight).

Upon receiving an event notification, an event time window is specified, as in 1203. An event time window may be any period of time that includes the event time or event time duration. For example, the event time window may include the event time or event time duration, the thirty seconds preceding the event time or the event time duration and thirty second following the event time or the event time duration.

Based on the event location and the event time window, a determination is made as to whether a user pattern is within a defined distance of the event location during the event time window, as in 1204. As discussed above with respect to FIG. 11, a defined distance may be any distance from an event location. The defined distance may be the same or different for different events, different locations, different users, etc. Likewise, while the examples discussed herein describe determining if a user pattern is within a defined distance of an event location, the implementations are equally applicable to determining if an event location is within a defined distance of a user pattern.

It may be determined if a user pattern is within the defined distance of the event location during the event time window by considering the location of user patterns during the event time window. As discussed above, the cluster aggregation system may provide location information for each user pattern. This information may be utilized to determine if a user pattern is within the defined distance of the event location during the event time window. If it is determined that there is no user pattern within a defined distance of the event location during the event time window, it is determined that no user is involved in the event, as in 1206. For example, an item may fall off a shelf due to vibrations in the store without involvement of a user. If it is determined that no user is involved in the event, the example process 1200 may complete. Alternatively, the example process 1200 may provide information (e.g., images, item information, event type, event location, event time or event time duration) for manual review. During manual review, a user who may be local or remote from the materials handling facility may review the information relating to the event to confirm the event information; in this instance to confirm that no user was involved in the event, and/or to provide other information.

If it is determined that a user pattern is located within a defined distance of the event location during an event time window, a determination is made as to whether multiple user patterns are within the defined distance of the event location during the event time window, as in 1208. Each additional user pattern may be determined to be within the defined distance of the event location during the event time window in a manner similar to that discussed above with respect to block 1204.

If it is determined that there are multiple user patterns within the defined distance of the event location during the event time window, the user disambiguation process 1600 is performed to determine which user pattern is to be associated with the event. The user disambiguation process 1600 is discussed further below with respect to FIG. 16.

If it is determined that only one user pattern is within the defined distance of the event location during the event time window, the user confirmation process 1300 is performed to confirm that the user pattern should be associated with the event. The event confirmation process 1300 is discussed further below with respect to FIG. 13.

Based on the results from either the user confirmation process 1300 (FIG. 13) or the user disambiguation process 1600 (FIG. 16), a determination is made as to whether a user pattern has been identified, as in 1210. If it is determined that a user pattern has not been identified and/or if a manual review notification was returned, the event notification and corresponding information is sent for manual review, as in 1212. The corresponding information may include images of the event location during the event time window, an identification of the user pattern(s) determined to be within the defined distance of the event location during the event time window, images of the user patterns during the event time window, etc.

If it is determined that the user pattern has been identified, the event is associated with the user pattern, as in 1214. For example, if the event was an item pick, the action of an item pick may be associated with the user pattern and/or the user associated with the user pattern. Likewise, the item involved in the event may be associated with the user pattern and/or the user associated with the user pattern.

Figure 13:
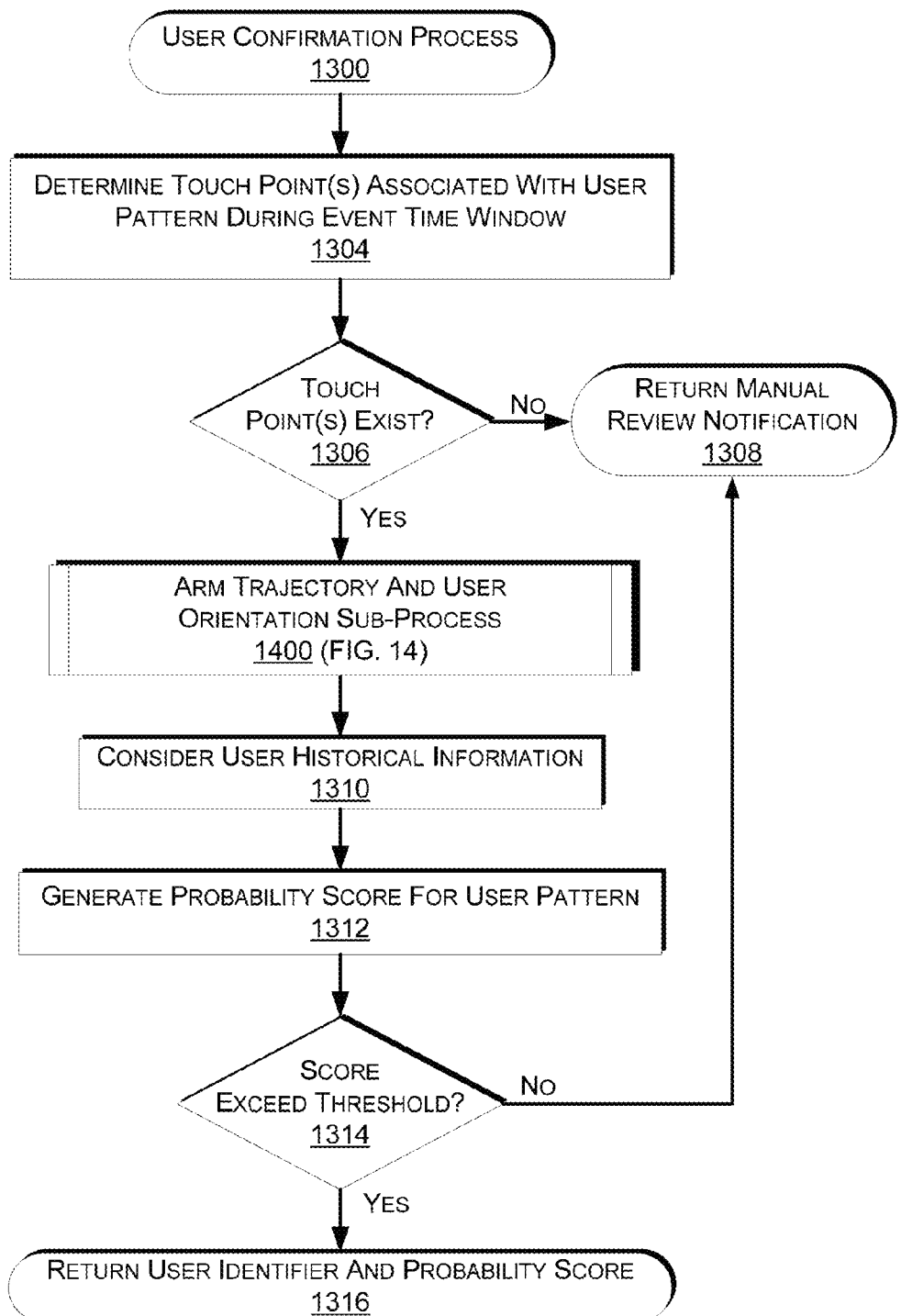
FIG. 13 is a flow diagram of an example user confirmation process, according to an implementation.

FIG. 13 is a flow diagram of an example user confirmation process 1300, according to an implementation. The user confirmation process may be performed for a single user pattern, as discussed above with respect to FIG. 12 and/or for multiple candidate user patterns, as discussed below with respect to FIG. 16.

The example process 1300 begins by determining touch points associated with the user pattern during the event time window and within the defined distance. A user touch point, as used herein, is a detected interaction between a user or a user pattern and an inventory location. For example, a touch point may include a user reaching into an inventory location, a user touching an item at an inventory location, a user leaning on an inventory location, a user moving very close to an inventory location, or any other interaction between a user or a user pattern and an inventory location. User touch points may be determined based on one or more input devices. For example, referring again to FIG. 11, a perimeter 1134 may be defined around each inventory shelf and if a user or user pattern enters the perimeter 1134, a touch point may be determined. For example, the user associated with user pattern 1104 has reached their arm 1126 across the perimeter 1134 and into the inventory location. The touch point may be defined as the three dimensional location of where the user reached into the inventory location. For example, overhead cameras, which may obtain both color and depth information, may be utilized to determine when a user, or a portion thereof, enters a perimeter 1134 and the location information corresponding to the image of the user within the perimeter may be utilized as the location of the touch point.

Returning to FIG. 13, a determination is made as to whether any touch points exist for the user pattern within the defined distance of the event location during the event time window, as in 1316. If it is determined that no touch points exist for the user pattern, the example process 1300 may send a manual review notification identifying that the event location and/or user pattern is to be reviewed manually to determine if the user was involved in the event. In instances where the example process 1300 is processing multiple user patterns with respect to an event notification, user patterns with no corresponding touch points may be removed from consideration and the example process 1300 may proceed with the other user patterns determined to be within the defined distance of the event location during the event time window.

If a touch point is determined to exist, the arm trajectory and user orientation sub-process 1400 (FIG. 14) is performed to link the user pattern to the touch point. The arm trajectory and user orientation sub-process 1400 is discussed further below with respect to FIG. 14.

In addition to considering the arm trajectory and user orientation of the user pattern, user historical information may also be considered to confirm that the user pattern is to be associated with the event, as in 1310. For example, the user historical information, such as which arm is typically utilized by the user to pick items, whether the user has previously picked the item involved in the event, the items picked by the user during the current session at the materials handling facility, etc. may be considered as a factor in determining the probability that the user associated with the user pattern was involved in the event.

Based on the determined touch points, arm trajectory, user pattern orientation, and/or the user pattern history, a probability score representative of the probability that the user participated in the event is determined, as in 1312. For example, a score representative of the likelihood of each factor may be considered and/or combined to generate a probability score. Based on the probability score, a determination is made as to whether the probability score exceeds a probability threshold, as in 1314. The probability threshold may be any defined threshold that must be satisfied before a user pattern is associated with an event. The probability threshold may be different for different user, different items, different inventory locations, different times of day, different materials handling facilities, etc.

If it is determined that the probability score for the user pattern does not exceed the probability threshold, a manual review notification is returned, as in 1308. The manual review notification may specify that the event and image information corresponding to the event location and/or user patterns within the defined distance of the event location during the event time window are to be reviewed manually in an effort to determine the user involved in the event.

However, if the probability score exceeds the probability threshold, the user identifier and optionally the probability score is returned, as in 1316. In implementations where the user confirmation process 1300 is considering multiple user patterns for an event, rather than determining if the probability score exceeds a threshold and either returning the probability score and user pattern or sending for manual review, each user pattern and probability score, once determined, may be returned. For example, when the user confirmation process 1300 is being performed as part of the example process 1600 (FIG. 16), once the probability score for each user pattern determined to be within the defined distance of the event location during the event time window is determined, the probability score is returned to the example process 1600.

In some implementations in which there is only one user pattern within the defined distance of the event location during the event time window, the example process 1300 may only consider whether there is a touch point near the event location and if there is an arm link between the event location and the user pattern. If a touch point and arm link between the user pattern and the touch point exist, it may be determined that the user was involved in the event, and the user identifier may be returned.

Figure 14:
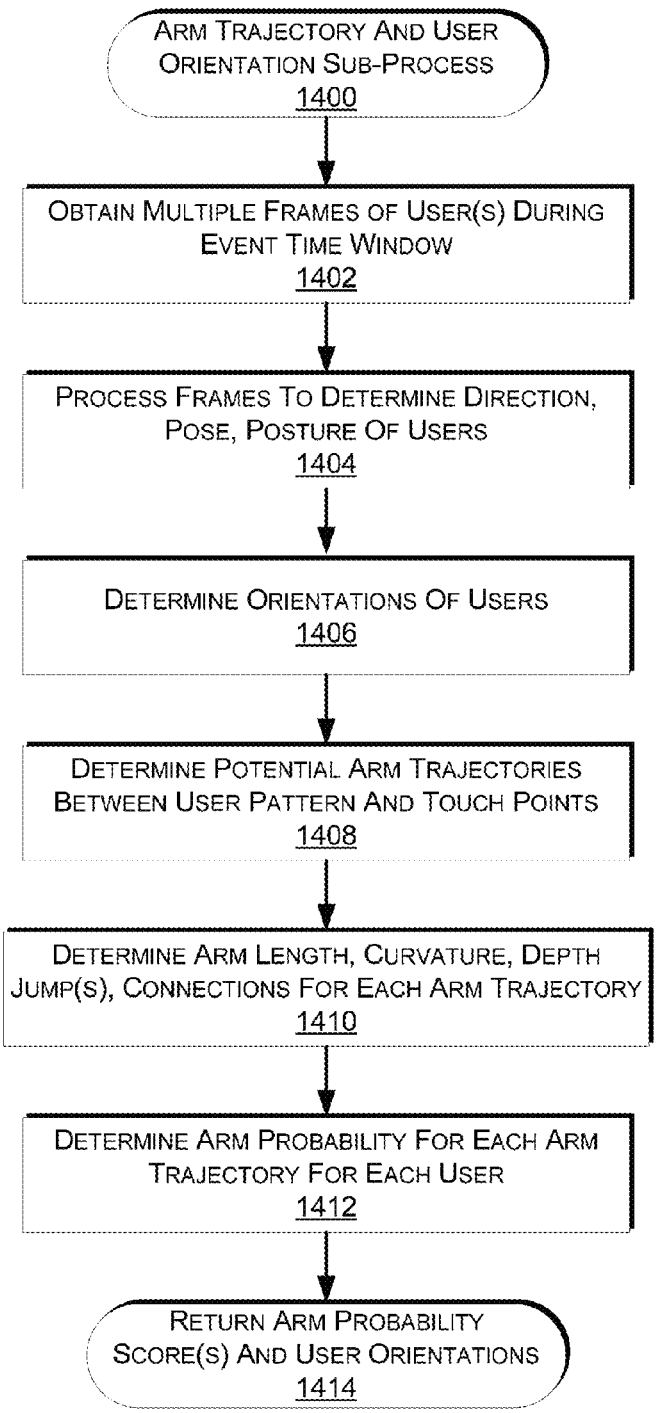
FIG. 14 if a flow diagram of an example arm trajectory and user orientation sub-process, according to an implementation.

FIG. 14 is a flow diagram of an example arm trajectory and user orientation sub-process 1400, according to an implementation. The example sub-process 1400 begins by obtaining multiple frames of video of the user during the event time window, as in 1402. For example, video that includes the user may be obtained by the cameras positioned above the inventory area. Alternatively, or in addition thereto, video and/or images of the user during the event time window may be obtained from other cameras located throughout the materials handling facility. For example, images may be obtained from cameras mounted on shelves of the inventory area.

The obtained images may be processed to determine the direction of movement, pose, posture, etc. of the user associated with the user pattern, as in 1404. For example, the frames may be processed using one or more algorithms, such as object detection, edge detection, grey scale analysis, etc. to determine the movement, direction, pose, posture, etc. of the user over the period of time represented by the frames, as in 1406. For example, an edge detection algorithm may be utilized to determine the user's head and/or shoulder shapes. Those shapes may be tracked through each frame, and based on the movement of the user between frames, the orientation of the user may be determined. For example, if it is determined that the user is walking north down an aisle, it may be determined that the user is oriented toward the north. In another example, depth information corresponding to pixels of each frame may be utilized, as discussed above, to determine the location and orientation of the user based on the changes in depth information between frames.

In some implementations, the orientation of the user may be determined and provided by the systems discussed above with respect to FIGS. 1-10. For example, the cluster aggregation system and/or the cluster processing system may determine the orientation of the user as the received image information is processed. In such an example, blocks 1402-1406 of FIG. 14 may be omitted and the user orientation may be obtained from other systems.

Figure 15:
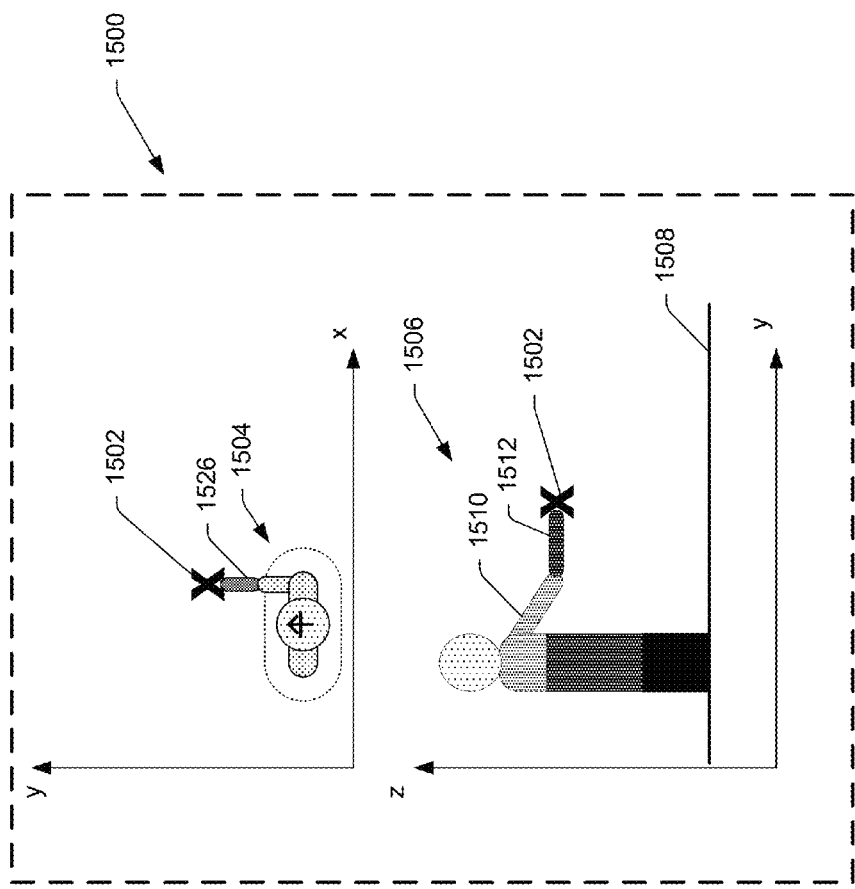
FIG. 15 is a block diagram of a two-dimensional depth view of a user pattern and arm trajectory, according to an implementation.

In addition to determining the orientation of the user, potential arm trajectories and links between the user pattern and the touch point(s) determined for the user pattern are determined, as in 1408, and the arm length, arm curvature, depth jumps, and connections between the object extending from the user pattern are determined, as in 1410. For example, the depth information obtained for the user pattern identifies the position of an object (e.g., arm) extending between the user pattern and the touch point. Utilizing the depth information, an arm trajectory may be established. For example, FIG. 15 illustrates a block diagram of a two-dimensional depth view 1500 of a user pattern 1504 and arm trajectory 1526, according to an implementation. The user pattern 1504 corresponds to the user pattern 1104 illustrated in FIG. 11.

The depth view 1500 illustrates the top-down view of the user pattern with horizontal position information (x, y) with respect to the inventory location and the touch point 1502. The side depth view 1506 illustrates a two-dimensional side view showing the depth information (y, z) of the user pattern 1504 above a surface 1508 (e.g., floor) of the materials handling facility. As can be seen, the side depth view 1506 illustrates the bend in the user's arm at the elbow. Specifically, the side depth view 1506 illustrates that the object extending from the user pattern includes a first segment 1510 that extends down from the user pattern starting at a location of the user's shoulder at approximately a forty-five degree angle. A second segment 1512 then extends substantially horizontal from the first segment to the touch point 1502. The shading of the user pattern 1504 and the side view 1506 illustrate, roughly, the depth information obtained by the overhead cameras for the pixels that represent the user and the user's arm. The light hatch pattern illustrates that the user's head is closest to the camera, followed by the users shoulder and the first segment of their arm 1510, as illustrated by the slightly denser hatch pattern. The user's torso and second arm segment 1512 as illustrated as darker than the user's shoulder and first arm segment 1510. Finally, the lower part of the user's body is illustrated in black, as being the furthest away from the overhead camera.

Utilizing the depth information and/or color values of the pixels that represent the user pattern and the object, the length of the segments of the object extending from the user pattern can be determined, the angle or curvature of the object can be determined, and the connection point or link between the user pattern and the object extending from the user pattern can be determined. In this example, it can be determined that the object 1526 is linked to the user pattern 1504 at the position of the user's right shoulder.

In some implementations, color information may likewise be used in addition to or as an alternative to depth information to determine trajectory and links of an object. For example, the color information of the object may be determined based on the color values of pixels representing the object. Likewise, color values of the pixels representing the user pattern may be determined. If the color values between the pixels of the user pattern and the color values of the object near the potential connection or link between the object and user pattern are consistent, such information may be utilized to determine that the object links to or is connected with the user pattern. For example, if the user is wearing a bright colored shirt (e.g., yellow) that has sleeves, the color values of the sleeve on the user's arm may be detected and determined to be consistent with color values of the shirt identified in the user pattern.

Returning to FIG. 14, utilizing the determined information, a probability that the object extending from the user pattern is an arm is determined, as in 1412. For example, the segment lengths may be compared to expected segment lengths of user arms to determine the likelihood that the object corresponds to the user's arm. The expected segment lengths may be known arm dimensions of the user and/or a standard or typical arm segment lengths for different heights of users. Likewise, the arm curvature determined for the object may be compared to typical and/or possible arm curvatures and the connection point between the object and the user pattern may be considered to determine if the object is joining the user pattern at the location where the user's shoulder is expected to be. In some implementations, user orientation may also be considered in determining the arm probability. For example, in determining the arm curvature, the orientation of the user pattern may be considered in determining if the arm curvature corresponds with the orientation of the user.

In some implementations, the user history of the user may likewise be considered in determining the arm probability. For example, the user history may identify the arm typically utilized by the user when performing an event and that historical information may be compared to the object and where it connects with the user pattern to determine if the object connection point corresponds with the arm typically utilized by the user.

The arm probability may be determined based on any combination of one or more of the factors discussed above. Finally, the arm probability score and user orientation is returned, as in 1414.

Figure 16:
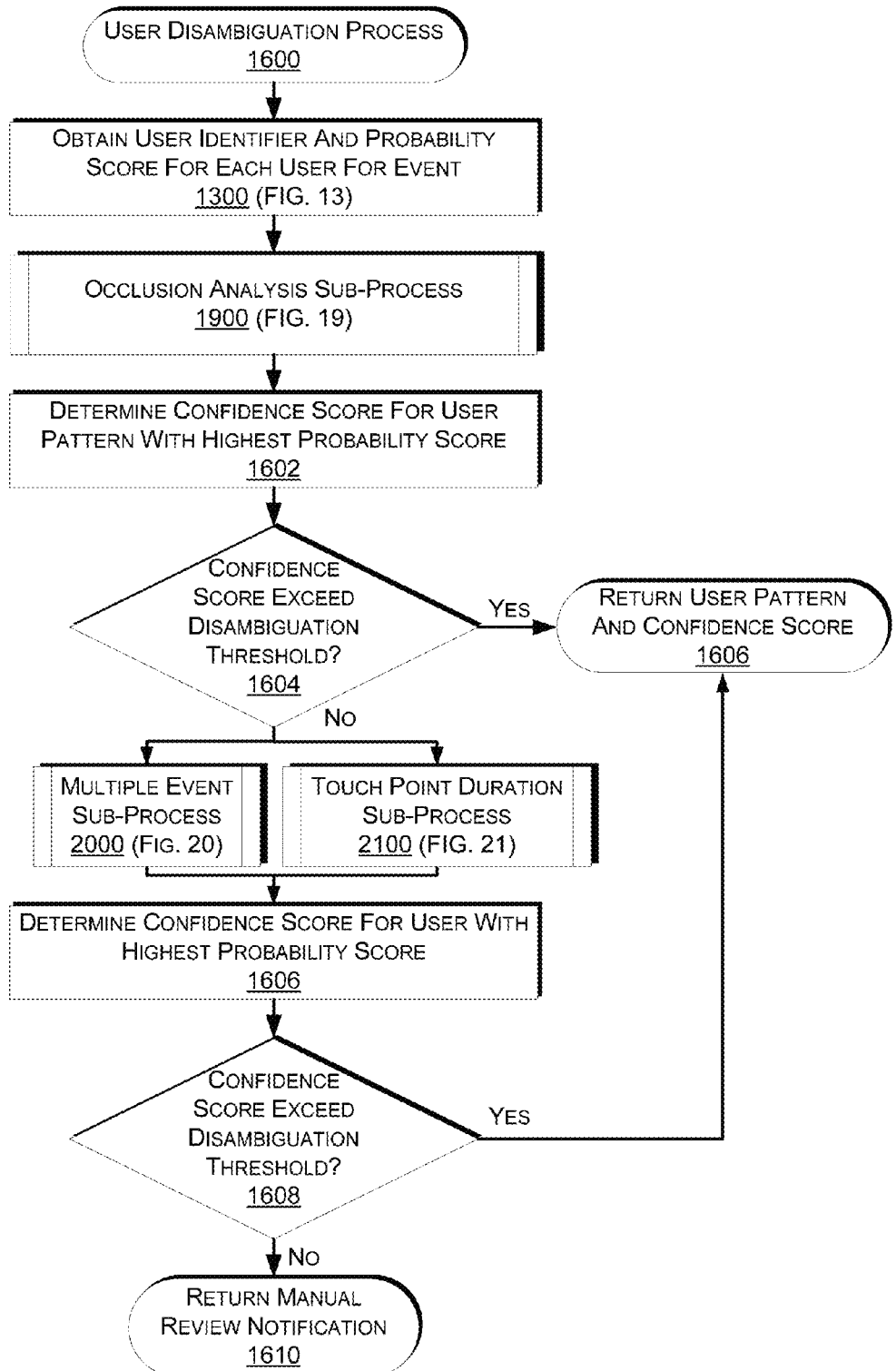
FIG. 16 is a flow diagram of an example user disambiguation process, according to an implementation.
Figure 17:
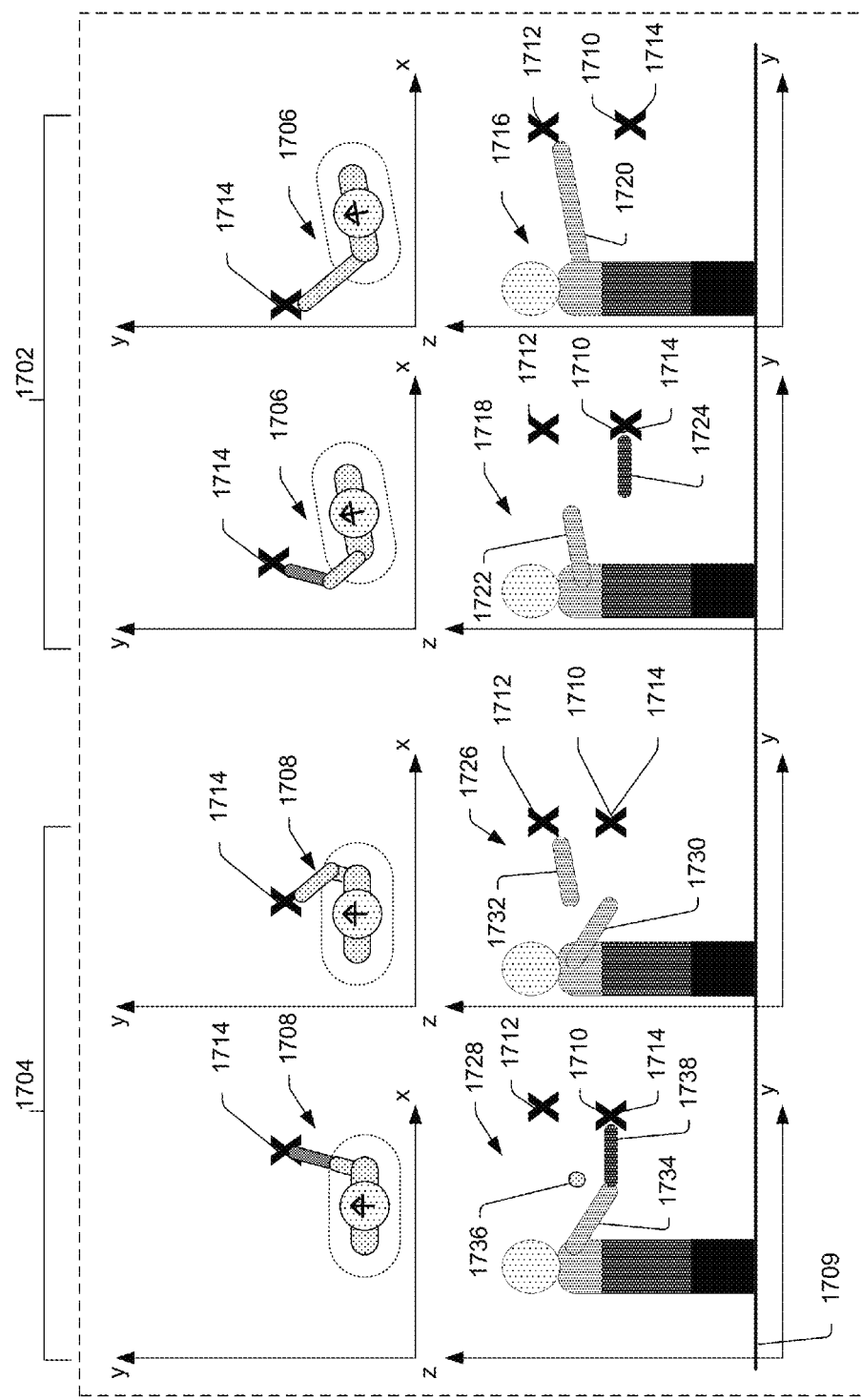
FIG. 17 is a block diagram of a two-dimensional depth view for disambiguating user patterns, according to an implementation.

FIG. 16 is a flow diagram of an example user disambiguation process 1600, according to an implementation. The example process 1600 begins by obtaining a user identifier and probability score for each user pattern determined to be within the defined distance of the event location during the event time window utilizing the example process 1300, discussed above with respect to FIG. 13. As discussed above with respect to FIG. 13, a probability score is determined for each user pattern determined to be within the defined distance during the event time window. When there are multiple users, the example arm trajectory and user orientation sub-process 1400 (FIG. 14) that is utilized as part of the example process 1300 may consider additional factors when establishing an arm probability score. For example, in instances when there are multiple users, there may be multiple touch points and/or multiple object paths for each user pattern between the user pattern and the touch points. Referring to FIG. 17, illustrated is a block diagram of two two-dimensional depth views 1702, 1704 of user patterns 1706, 1708 and potential arm trajectories, according to an implementation. The user patterns 1706, 1708 correspond to the user patterns 1106, 1108 illustrated in FIG. 11.

The depth view 1702 illustrates the top-down view of the user pattern 1706 with horizontal position information (x, y) with respect to the event location 1714 and the two potential arm paths between the event location and the user pattern 1706. The side depth views 1716, 1718 illustrate two two-dimensional side views showing the depth information (y, z) of the user pattern 1706 above a surface 1709 (e.g., floor) of the materials handling facility. Each of the side depth views 1716, 1718 correspond to different potential arm paths. In this example, the two users, represented by user patterns 1706, 1708 have crossed arms as they each reached into the inventory shelf. Because the user pattern is obtained from images positioned above the inventory area, two potential arm paths for each user pattern exist.

Looking first at the side depth view 1716 for user pattern 1706, the side depth view 1716 illustrates a single segment 1720 extending from the user pattern to the approximate location of the touch point 1712. Likewise, the side depth view 1716 illustrates that the touch point 1710 and event location 1714 are at a distance from segment 1720. Based on the side depth view, the user pattern 1706 with the segment 1720 has a low probability of corresponding to the event because of the distance between the touch point 1712 and the event location 1710.

Considering the side depth view 1718 for user pattern 1706, the side depth view 1718 illustrates two segments 1722, 1724 between the user pattern and the event location 1710. In this example, there is a depth jump between the connection point of the first segment 1722 and the second segment 1724. Based on the side depth view, and the depth jump between the two segments 1722, 1724, the user pattern 1706 has a low probability of corresponding to the event.

The depth view 1704 illustrates the top-down view of the user pattern 1708 with horizontal position information (x, y) with respect to the event location 1714 and the two potential arm paths between the event location and the user pattern 1708. The side depth views 1726, 1728 illustrate two two-dimensional side views showing the depth information (y, z) of the user pattern 1708 above a surface 1709 (e.g., floor) of the materials handling facility. Each of the side depth views 1726, 1728 correspond to different potential arm paths.

Looking first at the side depth view 1726 for user pattern 1708, the side depth view 1716 illustrates two segments 1730, 1732 extending between the user pattern and the event location 1710. The first segment 1730 extends from the user pattern at approximately at forty-five degree angle to the second segment. However, a depth jump between the first segment 1730 and the second segment 1732 exists. The second segment, at the higher depth, extends substantially horizontal to the touch point 1712. Likewise, the side depth view 1726 illustrates that the touch point 1710 and event location 1714 are at a distance from segment 1732. Based on the side depth view, the user pattern 1708 with the segments 1730, 1732 has a low probability of corresponding to the event because of the depth jump and the distance between the second segment 1732 and the event location 1710.

Considering the side depth view 1728 for user pattern 1708, the side depth view 1728 illustrates two segments 1734, 1736, 1738 extending from the user pattern to the approximate location of the touch point and the approximate location of the event location. In this example, the first segment 1734 extends at approximately a forty-five degree angle from the user pattern to the second segment. At the second segment 1736, there is a depth jump that extends for only a brief distance in a substantially horizontal direction. Finally, there is another depth jump between the second segment 1736 and the third segment 1738 and the third segment 1738 extends substantially horizontal to the touch point 1710 and event location 1714. Even though there is a depth jump between the first segment 1734 and the second segment 1736 and another depth jump between the second segment 1736 and the third segment 1738, the second segment 1736 may be discarded as a representation of the other users arm extending over the top of the arm extending from the user pattern 1708. Likewise, as illustrated, if additional information is obtained from other cameras, it may be determined that the first segment 1734 and the third segment 1738 are connected and that the second segment 1736 is separate, further confirming that the second segment 1736 can be discarded.

Based on the side depth view, the user pattern 1708 with the segments 1734, 1738 has a high probability of corresponding to the event, because the arm segments, curvature and connection points are all consistent with the event location.

FIG. 18 is another example of processing multiple user patterns to determine arm trajectories and links with user patterns as part of the example arm trajectory and orientation sub-process 1400 (FIG. 14). FIG. 18, is a block diagram of two two-dimensional depth views 1802, 1804 of user patterns 1810, 1812 and potential arm trajectories, according to an implementation. The user patterns 1810, 1812 correspond to the user patterns 1110, 1112 illustrated in FIG. 11.

The depth view 1802 illustrates the top-down view of the user pattern 1812 with horizontal position information (x, y) with respect to the event location 1814. The side depth views 1803 illustrate that there are no touch points corresponding to the user pattern 1812, no objects extending from the user pattern and the user pattern is not oriented toward the event location 1814. Accordingly, the user pattern 1812 will have a low probability of corresponding to the event.

The depth view 1804 illustrates the top-down view of the user pattern 1810 with horizontal position information (x, y) with respect to the event location 1814. The side depth view 1805 illustrates a two-dimensional side view showing the depth information (y, z) of the user pattern 1810 above a surface 1809 (e.g., floor) of the materials handling facility. As can be seen, the side depth view 1805 illustrates the bend in the user's arm at the elbow. Specifically, the side depth view 1805 illustrates that the object extending from the user pattern includes a first segment 1806 that extends down from the user pattern at a location of the user's shoulder at approximately a forty-five degree angle. A second segment 1808 then extends substantially horizontal from the first segment 1806 to the touch point 1814.

Utilizing the depth information and/or color values, the length of the segments of the object extending from the user pattern can be determined, the angle or curvature of the object can be determined and the connection point or link between the user pattern and the object extending from the user pattern can be determined. Based on the side depth view, the user pattern 1810 with the segments 1806, 1808 has a high probability of corresponding to the event, because the arm segments, curvature and connection points are all consistent with the event location.

Returning to FIG. 16, in addition to obtaining a probability score for each user pattern, the occlusion analysis sub-process 1900 may be performed to identify any occlusions near the event location. The occlusion analysis sub-process 1900 is discussed in further detail below with respect to FIG. 19 and potentially used to adjust the probability scores.

Based on the obtained probability scores for each user pattern determined to be within a defined distance of the event location during the event time window, a confidence score is determined for the user pattern with the highest probability, as in 1602. The confidence score may be determined based on the probability of the highest scoring user pattern and the probability of other high scoring user patterns. For example, if the user pattern with the highest probability score has a probability score of 94% and the next highest probability scores are 32% and 38%, the user pattern with the highest probability score will receive a high confidence score because it is unlikely that any of the other user patterns were involved in the event. In comparison, if the three highest probability scores for user patterns are 94%, 93%, 92%, the user pattern with the highest probability score will receive a low confidence score, because any of the user patterns with high probability scores may have been involved in the event and therefore, it cannot be determined with high confidence which user pattern was actually involved in the event.

A determination is then made as to whether the confidence score for the user pattern with the highest probability exceeds a disambiguation threshold, as in 1604. If the confidence score exceeds a disambiguation threshold, the user pattern with the highest confidence score is returned along with the confidence score and/or the probability score.

If it is determined that the confidence score does not exceed the disambiguation threshold, additional factors may be considered in an effort to disambiguate between the different user patterns within the defined distance of the event location during the event time window. For example, the multiple event sub-process 2000 (FIG. 20) may be performed if there are multiple events within the same defined distance and during the same event time window. The multiple event sub-process 2000 is discussed further below with respect to FIG. 20. Likewise, the touch point duration sub-process 2100 may be performed in which the duration of the touch points associated with each user pattern are considered as a factor in determining or adjusting the probability score for each user pattern. The touch point duration sub-process 2100 is discussed further below with respect to FIG. 21. Each of the additional factors may be used to adjust the probability scores for one or more of the user patterns.

Based on the adjusted probability scores for each user pattern determined to be within a defined distance of the event location during the event time window, a confidence score is again determined for the user pattern with the highest probability, as in 1606.

A determination is also again made as to whether the confidence score for the user pattern with the highest probability exceeds a disambiguation threshold, as in 1608. If the confidence score exceeds a disambiguation threshold, the user pattern with the highest confidence score is returned along with the confidence score and/or the probability score, as in 1606. However, if the confidence score does not exceed the disambiguation threshold, a manual review notification is returned, as in 1610. The manual review notification may specify that the event and image information corresponding to the event location and/or user patterns within the defined distance of the event location during the event time window are to be reviewed manually in an effort to determine the user involved in the event.

Figure 19:
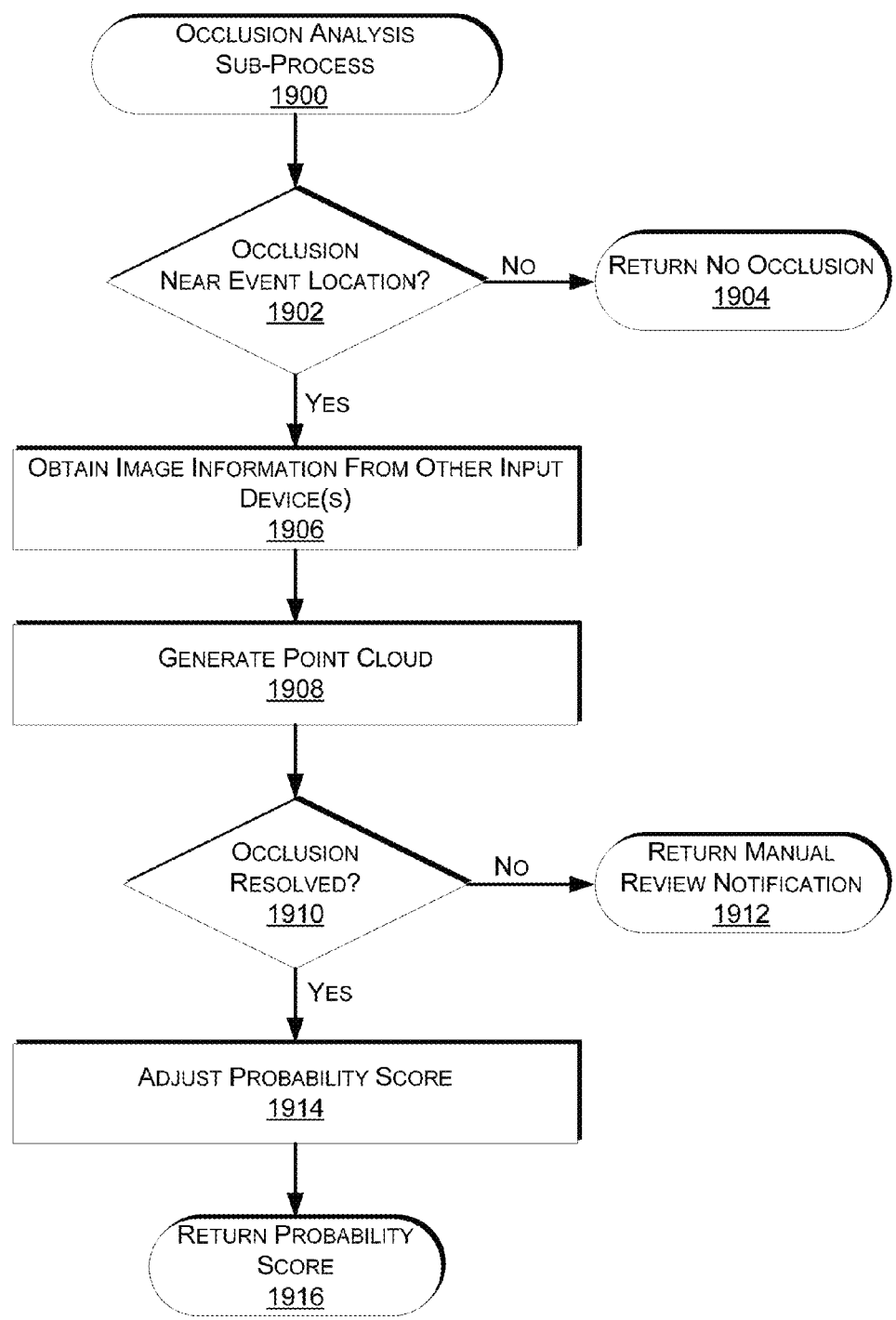
FIG. 19 is a flow diagram of an example occlusion analysis sub-process, according to an implementation.

FIG. 19 is a flow diagram of an example occlusion analysis sub-process 1900, according to an implementation. The example sub-process 1900 begins by determining if there is an occlusion or an area near the event location that is blocked from the field of view of the cameras used to generate determine touch points, links between user patterns and touch points and/or user pattern, other than an expected occlusion from a user's hand at the event location, as in 1902. For example, if there are multiple users standing adjacent to one another, one of the users may partially occlude a portion of another user near the event location from the perspective of the cameras located above the inventory area. For example, referring back to FIG. 11, there is an occlusion between user patterns 1114 and 1116 because it cannot be determined from the depth information obtained from the cameras positioned above the inventory area whether the arm extending from the user patterns corresponds to user pattern 1114 or user pattern 1116. As another example, if a user is leaning in close to an inventory shelf such that they breach the perimeter 1134 as they perform an event, it may be determined that an occlusion exists.

If it is determined that there is no occlusion, a no occlusion notification is returned, as in 1904. However, if it is determined that an occlusion exists near the event location, image information may be obtained from other cameras that have overlapping fields of view with the event location, as in 1906. As discussed above, the cameras may be position so that the field of view of each camera overlaps. If an event occurs at an event location in which two or more camera fields of view overlap, the image information from the adjacent cameras may be obtained. In addition to using image information from other overhead cameras, in some implementations, image information may be obtained from cameras at other positions within the materials handling facility. For example, image information (e.g., color values, depth information) from cameras positioned within or on inventory shelves may be obtained and utilized.

Utilizing the image information from the camera associated with the area that includes the event location and image information obtained from other cameras, a full point cloud of the area around the event location may be generated, as in 1908. For example, multiple point clouds representative of different periods of time for the event location may be generated from different fields of view and combined to establish a complete point cloud that may provide additional information.

Because the other cameras have different points of reference and different fields of view, the fields of view of the other camera(s) may provide additional information that can be used to resolve the occlusion. For example, while the field of view from the camera associated with the area of the event location may be occluded by a user leaning over another user, an adjacent camera and/or a camera positioned on the shelf facing into the aisle may not be occluded. By utilizing the information from multiple cameras, a point cloud may be generated that considers the depth information and/or color value information from each of the multiple cameras.

A determination is then made as to whether the point cloud can be used to resolve the occlusion and provide information for the area in which the field of view is blocked, as in 1910. If the occlusion is not resolved, the example process returns a manual review notification, as in 1912, indicating that the event and/or image information corresponding to the event is to be manually reviewed in an effort to associate a user with the event.

If the occlusion is resolved, the probability score for one or more of the user patterns may be adjusted based on the additional information, as in 1916. For example, the combined information may identify an arm trajectory that can be linked to a user pattern. Based on the linking, the probability score for the user pattern may be updated. Finally, the updated probability score(s) are returned to the example process 1600 (FIG. 16) and the sub-process 1900 completes.

Figure 20:
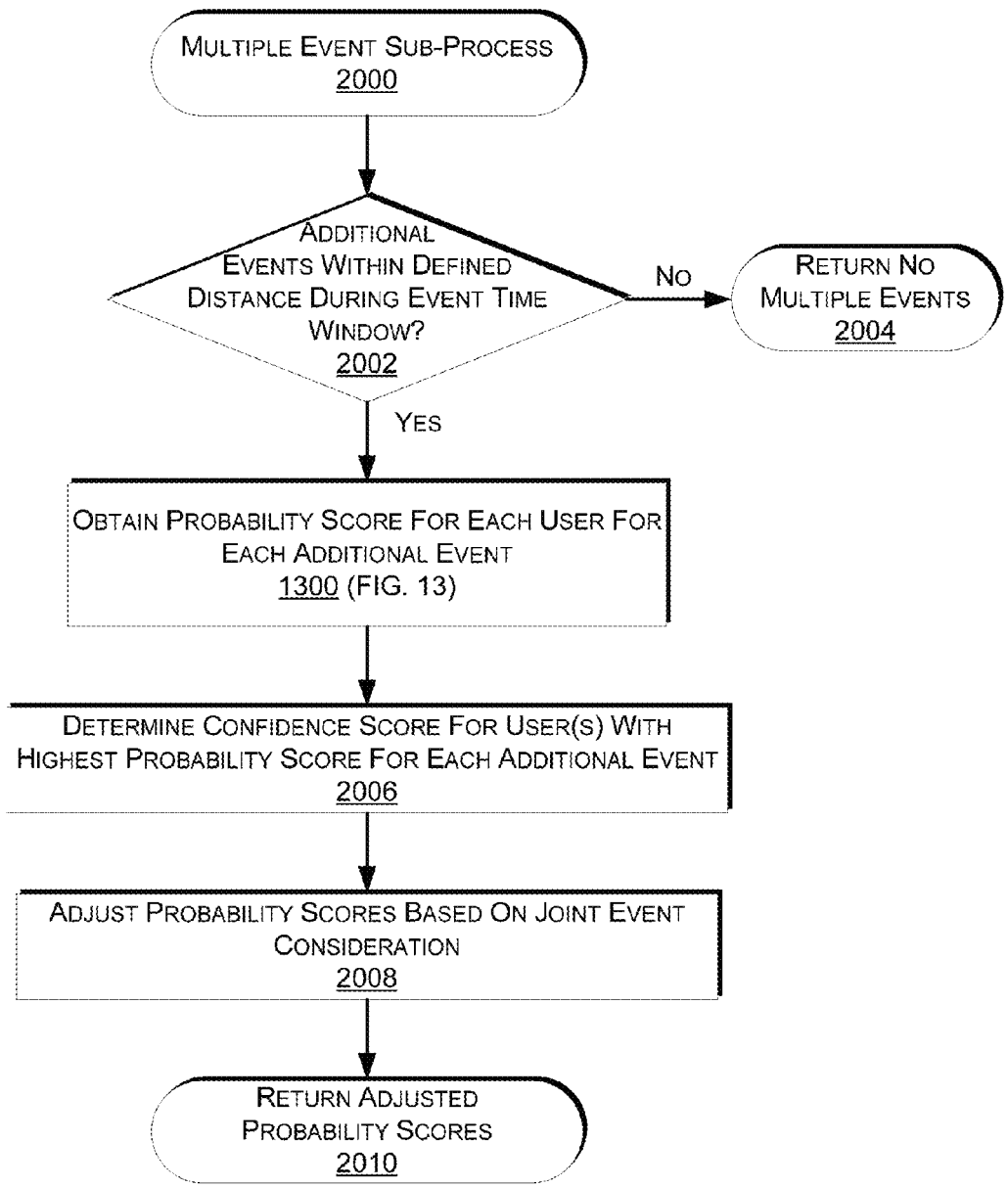
FIG. 20 is a flow diagram of an example multiple event sub-process, according to an implementation.

FIG. 20 is a flow diagram of an example multiple event sub-process 2000, according to an implementation. The example sub-process 2000 begins by determining if there are multiple events in the defined distance of the event location during the event time window, as in 2002. If it is determined that there are no additional events within the defined distance during the event time window, the example sub-process 2000 returns a no multiple events notification and completes, as in 2004.

If it is determined that there are multiple events within the defined distance during the event time window, the probability scores for each user pattern with respect to each event are obtained using the example process 1300 (FIG. 13), as discussed below. Likewise, a confidence score is determined for each user with a highest probability score for each event, as in 2006. For example, if there are three events within the defined distance during the event time period, a confidence score is determined for each user pattern having a highest probability score for each event.

Based on the confidence scores of the additional events, one or more of the probability scores for the user patterns determined to be within the defined distance of the event location may be adjusted, as in 2008. For example, if there are three users (user A, user B, user C) that had initial probabilities of 88%, 84%, 82%, respectively, for a first event, one or more of those probabilities may be adjusted based on the confidence scores generated for a second event. To illustrate, if user C has the highest probability for a second event and a confidence score of 98% for the second event, it may be determined that user B is associated with the second event. Accordingly, the probability that user B is also involved in and should be associated with the first event may be reduced because it is unlikely that user B was involved in both events. This adjustment to the probability of user B being involved in the first event may be based on the association of user B with the second event and/or based on the distance and time between the first event and the second event. For example, if the first event and the second event occurred within a close distance of one another (e.g., a few feet), the probability of user B being associated with the first event may not be reduced or may not be substantially reduced. In comparison, if the first event and the second event occurred several feet away from one another (e.g., five feet) but close in time, the probability that user B was involved in both events is very low due to the physical separation in distance. As such, the probability that user B was involved in the first event may be substantially reduced.

Determining confidence scores for user patterns corresponding to additional events may be performed for each user and/or each additional event and the adjusted probability scores are returned to the example process 1600.

Figure 21:
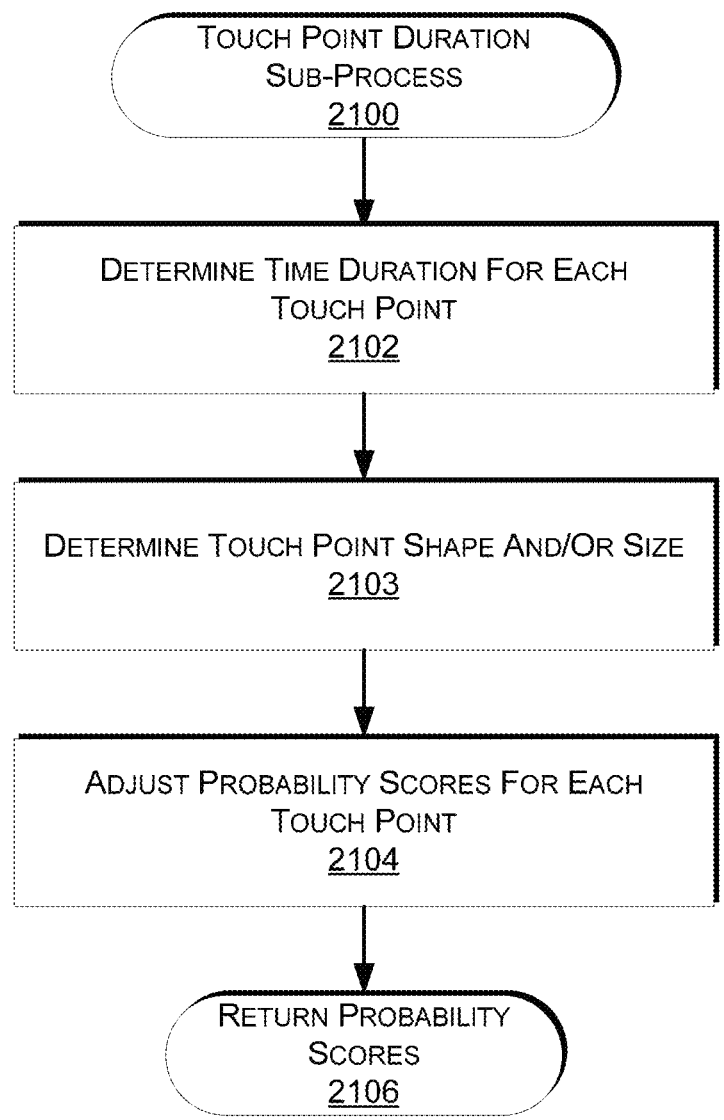
FIG. 21 is a flow diagram of an example touch point duration sub-process, according to an implementation.

FIG. 21 is a touch point duration sub-process 2100, according to an implementation. The example sub-process 2100 begins by determining a time duration for each touch point of each user pattern within the defined distance of the event location during the event time window, as in 2102. Likewise, the size and/or shape of the touch points are determined, as in 2103. For example, if the user is reaching into an event location, the size and shape of the touch point may be consistent with the size and shape of a user's arm reaching into or out of an inventory location. In some implementations, the size and shape of the touch point at the beginning of the touch point detection and at the end of the touch point detection may be determined and compared. For example, if the user is reaching into the inventory location, selects and picks an item and then removes their hand form the inventory location while holding the item, the size and shape of the touch point from the beginning of the touch point detection to the end of the touch point detection may be different. In such an example, the size and shape of the touch point as the user reaches into the inventory location and the size and shape of the touch point as the user removes their hand from the inventory location may be compared to identify that a user has picked an item. Such a touch point size and shape may be considered consistent with the size and shape of a touch point involved in the event.

In comparison, if the size and shape of the touch point is large (e.g., a user leaning on a shelf or leaning into a shelf to look at an item), it may be determined that the size and shape of the touch point is not consistent with the size and shape expected for the event.

If the time duration and/or the size and shape of the touch point corresponds to a typical time, size and/or shape for the event action, the probability score may not be adjusted or it may be increased. However, if the time duration, size and/or shape of a touch point does not correspond with a typical time duration, size and/or shape for the event, the probability score may be decreased for that user pattern, as in 2104. For example, if the typical time duration for a touch point of an item pick (event) is thirty seconds, any touch points within a range of the typical time duration (e.g., ±five seconds) may be considered appropriate. However, any touch point beyond that range, such as a longer touch point, which may be representative of a user leaning on the inventory shelf, may be determined and the probability for the correspond user pattern decreased. After adjusting the probability scores for the user patterns based on the touch point time durations, sizes and/or shapes, the user patterns and probability scores are returned to the example process 1600 (FIG. 16), as in 2106.

Figure 22:
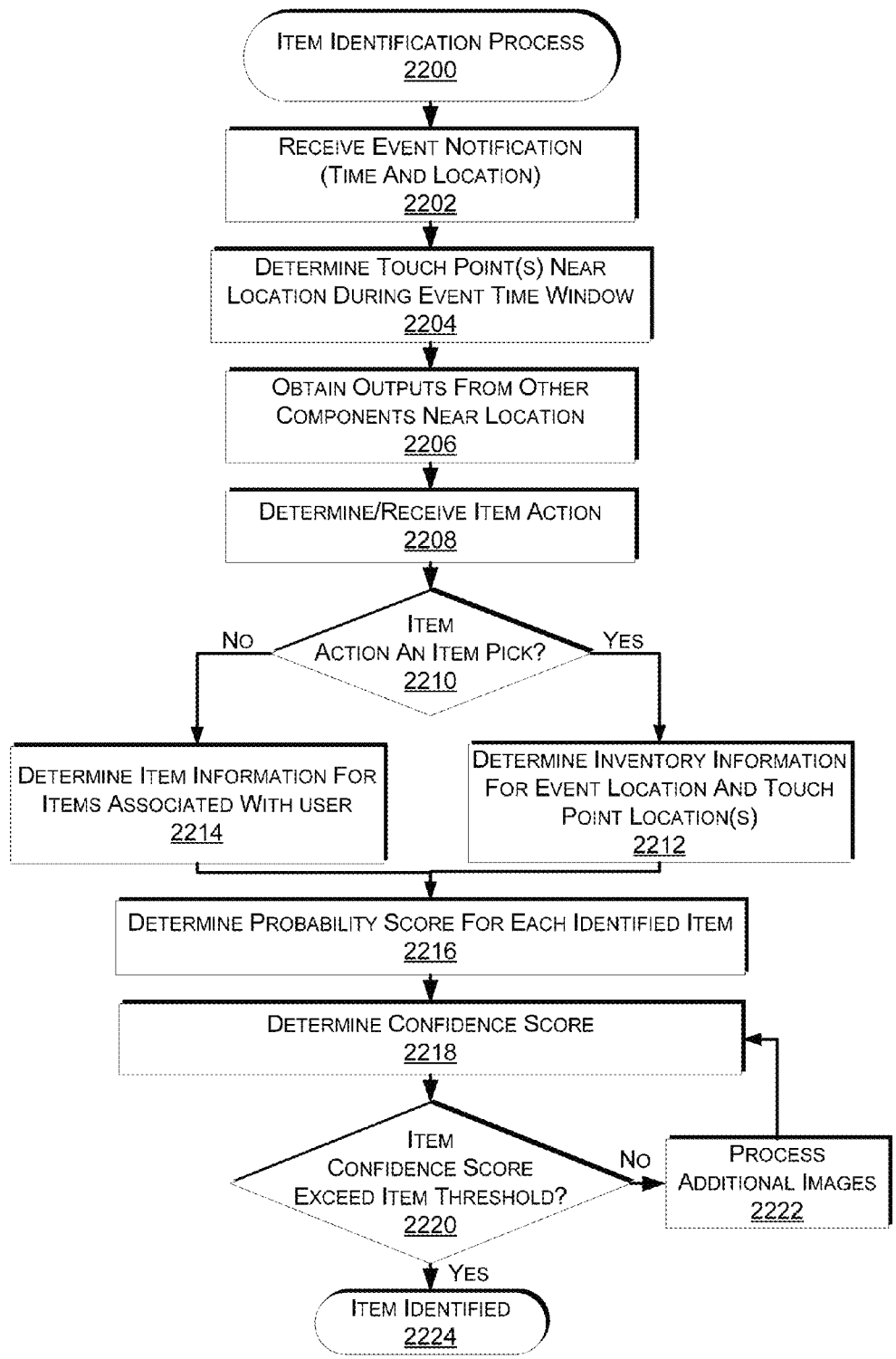
FIG. 22 is a flow diagram of an example item identification process, according to an implementation.

FIG. 22 is an example item identification process 2200, according to an implementation. The example process 2200 begins upon receipt of an event notification, as in 2202. As discussed above, an event notification identifies an event time or event time duration and an event location, which may be a specific location or area or an identification of a location or area (e.g., an inventory location). Likewise, the touch points for user patterns within a defined distance of the event location during the event time window may also be determined, as in 2204. In addition, in some implementations, outputs from other components near the event location may be obtained, as in 2206. Other components may be any components within the materials handling facility. For example, output may be obtained from an RFID reader identifying a change in a position, absences or addition of an RFID tag, a load cell identifying a change in a weight at an inventory location, etc. In still other implementations, image information may be obtained from cameras near the event location that are processed to aid in item identification. For example, in addition to using the cameras positioned over the inventory area to associate a user with an event, images captured by those cameras may be processed to identify whether an item was picked or placed at an inventory location, to determine item characteristics (e.g., shape, size, color), and the like.

The item action (e.g., item pick, item place) may likewise be determined or received from another system, as in 2208. For example, images of a user establishing a touch point (e.g., reaching into an inventory location) and a user ending a touch point (e.g., removing their hand from the event location) may be processed and compared to determine if the user was holding an item when they reached into the inventory location and/or removed their hand from the inventory location. As discussed above, any variety of image processing techniques may be used to process and compare the images.

A determination is then made as to whether the item action is an item pick, as in 2210. If it is determined that the item action is an item pick, inventory information for the inventory location(s) corresponding to the event location and/or the touch point locations is determined, as in 2212. For example, as discussed above, the inventory management system maintains an inventory of items at each inventory location.

If it is determined that the item action was not an item pick (i.e., it was an item place) item information corresponding to the user pattern determined to be involved in the item action (an event) is determined, as in 2214. For example, as item actions (item picks, item places) are performed by a user while the user is located in the materials handling facility, the picked/placed items are identified and an item identifier list associated with the user pattern is updated to identify the items associated with the user.

For each identified item, a probability score is determined that represents the probability that the item was involved in the action, as in 2216. The probability score is determined based on the collected factors. For example, the probability score may be based on, for each item, the location of the item with respect to the event location and/or touch points, the identifier (e.g., RFID) associated with the item and/or received from the RFID reader, a weight of the item, a visual identifier (e.g., barcode) associated with the item and/or detected by the visual reader, etc.

Based on the probability scores, a confidence score for the item with the highest probability score is determined, as in 2218. As discussed above, the confidence score may be determined based on the probability of the highest scoring item and the probability of other high scoring items. For example, if the item with the highest probability score has a probability score of 94% and the next highest probability scores are 32% and 38%, the item with the highest probability score will receive a high confidence score because it is unlikely that any of the other items were involved in the event. In comparison, if the three highest probability scores for are 94%, 93%, 92%, the item with the highest probability score will receive a low confidence score, because any of the items with the high probability scores may have been involved in the event and therefore, it cannot be determined with high confidence which item was actually involved in the event.

Based on the confidence score, a determination is made as to whether the item confidence score exceeds an item threshold. The item threshold may be any defined value and may vary for different items, different locations, etc. If it is determined that the confidence score does not exceed the item threshold, additional images may be processed in an effort to identify the item, as in 2222. For example, if the action was an item pick, images of the user may continue to be obtained and if the user places the item in a tote or other container, the item may become more visible to the cameras. In such an instance, the additional images may be used to identify the item that was picked by the user. As another example, if the action is an item place, but the placed item cannot be identified, images of other items maintained by the user may be processed to identify which item identified on the associated item identifier list is no longer in the possession of the user.

As the additional images are process, the example process 2200 returns to bock 2216 and the probability scores are adjusted. Returning to decision block 2220, if it is determined that the item confidence score exceeds the item threshold, the item is identified, as in 2224, and the example process 2200 completes.

Figure 23:
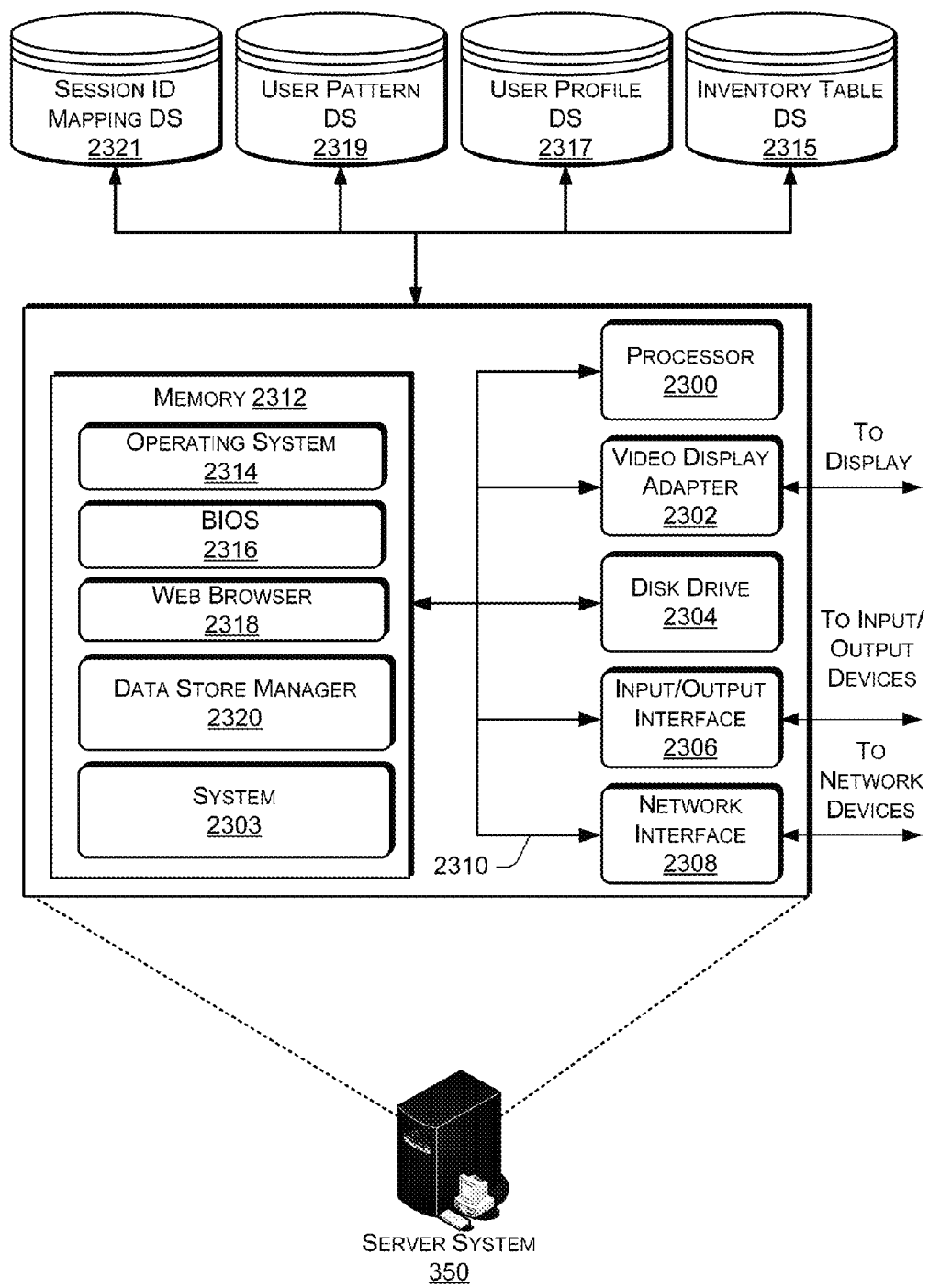
FIG. 23 is a block diagram of an illustrative implementation of a server system that may be used with various implementations.

FIG. 23 is a pictorial diagram of an illustrative implementation of a server system, such as the server system 350, that may be used in the implementations described herein. The server system illustrated in FIG. 23, or another similar server system, may be configured as a cluster processing system, the cluster aggregation system and/or for the inventory management system.

The server system 350 may include a processor 2300, such as one or more redundant processors, a video display adapter 2302, a disk drive 2304, an input/output interface 2306, a network interface 2308, and a memory 2312. The processor 2300, the video display adapter 2302, the disk drive 2304, the input/output interface 2306, the network interface 2308, and the memory 2312 may be communicatively coupled to each other by a communication bus 2310.

The video display adapter 2302 provides display signals to a local display (not shown in FIG. 23) permitting an operator of the server system 350 to monitor and configure operation of the server system 350. The input/output interface 2306 likewise communicates with external input/output devices not shown in FIG. 23, such as a mouse, keyboard, scanner, or other input and output devices that can be operated by an operator of the server system 350. The network interface 2308 includes hardware, software, or any combination thereof, to communicate with other computing devices. For example, the network interface 2308 may be configured to provide communications between the server system 350 and other computing devices via the network 302, as shown in FIG. 3.

The memory 2312 generally comprises random access memory (RAM), read-only memory (ROM), flash memory, and/or other volatile or permanent memory. The memory 2312 is shown storing an operating system 2314 for controlling the operation of the server system 350. A binary input/output system (BIOS) 2316 for controlling the low-level operation of the server system 350 is also stored in the memory 2312.

The memory 2312 additionally stores program code and data for providing network services. The data store manager application 2320 facilitates data exchange between the inventory table data store 2315, the user profile data store 2317, the user pattern data store 2319 and/or the session identifier mapping data store 2321.

As used herein, the term "data store" refers to any device or combination of devices capable of storing, accessing and retrieving data which may include any combination and number of data servers, databases, data storage devices and data storage media in any standard, distributed or clustered environment. The server system 350 can include any appropriate hardware and software for integrating with the data stores 2315-2321 as needed to execute aspects of the inventory management system 150.

The data stores 2315-2321 can include several separate data tables, databases or other data storage mechanisms and media for storing data relating to a particular aspect. For example, the data stores 2315-2321 illustrated include mechanisms for maintaining inventory information (e.g., item locations, images of item when properly positioned, depth map information for an item located on an inventory shelf, item features), user profile information, user pattern information, mappings between session identifiers and user identifiers, etc. Depending on the configuration and user of the server system 350, one or more of the data stores may not be included or accessible to the server system 350. For example, if the server system is supporting the cluster processing system, the server system 350 may not include and/or be able to access the user profile data store 2317, the inventory table data store 2315 and/or the session ID mappings data store 2321.

It should be understood that there can be many other aspects that may be stored in the data stores 2315-2321. The data stores 2315-2321 are operable, through logic associated therewith, to receive instructions from the server system 350 and obtain, update or otherwise process data in response thereto.

The memory 2312 may also include the inventory management system, cluster processing system, or the cluster aggregation system, as discussed above and as generally illustrated by the system 2303. The corresponding system 2303 may be executable by the processor 2300 to implement one or more of the functions of the server system 350. In one implementation, the corresponding system 2303 may represent instructions embodied in one or more software programs stored in the memory 2312. In another implementation, the corresponding system 2303 can represent hardware, software instructions, or a combination thereof.

It will be appreciated by those of ordinary skill in the art that such a system could operate equally well in a system having fewer or a greater number of components than are illustrated in FIG. 23. Thus, the depiction in FIG. 23 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer implemented method, comprising:
under control of one or more computing systems configured with executable instructions, receiving an event notification that includes an event location and an event time for an event;
determining an event time window that includes the event time;
determining a user pattern located within a defined distance of the event location during the event time window;
processing a plurality of images that include a representation of a user associated with the user pattern to identify an object extending from the event location to the user pattern;
determining that at least one of a curvature of the object or a length of the object corresponds with an expected arm curvature or an expected arm length;
determining, based at least in part on the determination that at least one of the curvature of the object or the length of the object corresponds with an expected arm curvature or an expected arm length, a probability that the object is a user arm extending from the user to the event location;
determining that the probability exceeds a threshold; and
associating the user pattern with the event.

2. The computer implemented method of claim 1, wherein determining the probability that the object is a user arm is further based at least in part on a determined pose of the user, a direction of movement of the user, an orientation of the user, a curvature of the object, a trajectory of the object, a connection between the object and the user, or a posture of the user.

3. The computer implemented method of claim 1, wherein determining the probability includes:
determining depth information corresponding to the object and the user; and
determining that a connection between the object and the user corresponds with a position of a shoulder of the user based at least in part on the determined depth information.

4. A computing system, comprising:
a processor; and
a memory coupled to the processor and storing program instructions that when executed by the processor cause the processor to at least:
receive an event notification, wherein the event notification includes an event location corresponding to an event;
determine a user pattern within a defined distance of the event location; and
process a plurality of images that each include a corresponding representation of the event location to determine that a link exists between the event location and the user pattern;
process an image of the plurality of images to obtain depth information corresponding to pixels of the image and determine an object represented in the image extending from the user pattern;

process the depth information to determine a length of the object;

compare the length of the object with an expected arm length, wherein the expected arm length is at least one of: a known arm length of a user associated with the user pattern, or a stored arm length; and associate the user pattern with the event based at least in part on the determination that the link exists between the event location and the user pattern.

5. The computing system of claim 4, wherein:

the event notification includes an event time; and the program instructions that when executed by the processor further include instructions that cause the processor to at least:

determine that the user pattern is within the defined distance of the event location during an event time window that includes the event time.

6. The computing system of claim 4, wherein the program instructions that when executed by the processor further cause the processor to at least:

determine a touch point within the defined distance of the event location, wherein the touch point is a location of an interaction between a user and an inventory location; and determine that the object extends between the touch point and the user pattern.

7. The computing system of claim 6, wherein the link includes the object.

8. The computing system of claim 6, wherein the depth information represents a distance of a user's arm from a surface.

9. The computing system of claim 6, wherein the program instructions that when executed by the processor further cause the processor to at least:

process the depth information to determine at least one of a curvature of the object, a connection of the object with the user pattern, a trajectory of the object, a position of the object with respect to the event location, or an orientation of the user pattern.

10. The computing system of claim 9, wherein the program instructions that when executed by the processor further cause the processor to at least:

determine an orientation of the user based at least in part on a determined trajectory of the user pattern associated with the user, a posture of the user, or a pose of the user.

11. The computing system of claim 4, wherein the program instructions that when executed by the processor further cause the processor to at least:

determine a probability that a user associated with the user pattern was involved in the event.

12. The computing system of claim 11, wherein the program instructions that when executed by the processor to cause the processor to determine a probability further include instructions that cause the processor to at least:

determine a trajectory of the object extending from the user pattern based at least in part on depth information obtained from a representation of the object; and determine the probability based at least in part on the determined trajectory.

13. The computing system of claim 4, wherein the event notification is received from a pressure sensor positioned at an event location, the event notification generated in response to a detected change in a weight at the event location.

14. A computer implemented method, comprising:

under control of one or more computing systems configured with executable instructions, receiving an event notification that includes an event location and an event time for an event, wherein the event is at least one of an item pick or an item place;

determining an event time window that includes the event time;

determining a user pattern located within a defined distance of the event location during the event time window;

processing a plurality of images that each include a corresponding representation of the event location during the event time window to determine:

an object represented in the image extending from the user pattern; and a length of the object;

comparing the length of the object with an expected arm length, wherein the expected arm length is at least one of: a known arm length of a user associated with the user pattern, or a stored arm length; and determining, based at least in part on the comparing, a probability that a user associated with the user pattern performed the event.

15. The computer implemented method of claim 14, wherein the plurality of images are obtained from cameras positioned above an inventory area.

16. The computer implemented method of claim 14, wherein the event time window identifies a period of time that begins before the event time and extends after the event time.

17. The computer implemented method of claim 14, wherein the event location identifies a first location in which the event initiated and a second location in which the event ended and includes an area between the first location and the second location.

18. The computer implemented method of claim 14, wherein:

the probability is further based at least in part on a determined arm trajectory for the object extending from the user pattern;

the arm trajectory is determined based at least in part on depth information obtained from at least one image of a plurality of images; and the plurality of images are obtained from a position above the event location.

19. A method, comprising:

processing at least a portion of an image that includes a representation of at least a portion of an event location of an event that includes an item to determine an object linking the event location and at least a portion of a user represented in the image; and determining, based at least in part on one or more of the object or the linking, a probability that the user performed the event.

20. The method of claim 19, further comprising:

detecting the event, wherein the event is at least one of an item pick or an item place.

21. The method of claim 19, further comprising:

determining a touch point at the event location; and determine that the object extends between the touch point and the user pattern.

* * * * *